US012208618B2

(12) United States Patent
Adachi et al.

(10) Patent No.: US 12,208,618 B2
(45) Date of Patent: Jan. 28, 2025

(54) RECORDING SYSTEM AND CONTROL METHOD FOR RECORDING SYSTEM

(71) Applicant: SEIKO EPSON CORPORATION, Tokyo (JP)

(72) Inventors: Hirohisa Adachi, Matsukawa-machi (JP); Masaki Miyazawa, Matsumoto (JP); Kenji Uchibori, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 214 days.

(21) Appl. No.: 18/145,559

(22) Filed: Dec. 22, 2022

(65) Prior Publication Data

US 2023/0202178 A1 Jun. 29, 2023

(30) Foreign Application Priority Data

Dec. 27, 2021 (JP) ................................ 2021-213175

(51) Int. Cl.
*B41J 2/165* (2006.01)

(52) U.S. Cl.
CPC ................................ *B41J 2/16511* (2013.01)

(58) Field of Classification Search
CPC .......... B41J 2/16511; B41J 2002/16591; B41J 2/16585; B41J 2/16508; B41J 29/393
See application file for complete search history.

(56) References Cited

U.S. PATENT DOCUMENTS

2020/0247152 A1* 8/2020 Nakazawa ........... B41J 2/16585

FOREIGN PATENT DOCUMENTS

JP 2014-054819 A 3/2014
JP 2020-124839 A 8/2020

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

A maintenance operation can be executed by ejecting a liquid when a time measured with reference to displacement of a cap from a maintenance position to a separation position exceeds a defined time. Before start of a recording operation in a recording job, a first medium waits at a standby position where the medium can wait upstream of a liquid ejection head. The cap is located at the separation position when a first medium in the recording job is waiting at the standby position. During an initial control period, in parallel with the maintenance operation, a post-processing operation can be executed on a second number of media that is smaller than a first number of media, and a post-processing operation can be executed on the first number of media in parallel with the maintenance operation after end of the initial control period.

12 Claims, 10 Drawing Sheets

FIG. 6

| STAGE | NUMBER OF SHEETS TO BE PROCESSED | |
|---|---|---|
| | FIRST MODE | SECOND MODE |
| FIRST INITIAL CONTROL PERIOD | ONE SHEET | – |
| SECOND INITIAL CONTROL PERIOD | SECOND NUMBER OF SHEETS S2 | – |
| NORMAL CONTROL PERIOD | FIRST NUMBER OF SHEETS S1 | FIRST NUMBER OF SHEETS S1 |

RECORDING SYSTEM AND CONTROL METHOD FOR RECORDING SYSTEM

The present application is based on, and claims priority from JP Application Serial Number 2021-213175, filed Dec. 27, 2021, the disclosure of which is hereby incorporated by reference herein in its entirety.

BACKGROUND

1. Technical Field

The present disclosure relates to a recording system capable of performing a recording operation of performing recording on a medium by ejecting liquid onto the medium and a post-processing operation of performing post-processing on the medium after the recording.

2. Related Art

For example, JP-A-2014-54819 discloses a recording system including a transport section that transports a medium along a transport path, a liquid ejection head that ejects a liquid, a cap that can come into contact with the liquid ejection head, and a post-processing section that can execute a post-processing operation on a medium after recording. The cap has a function of suppressing drying of the liquid ejection head by coming into contact with the liquid ejection head when the recording operation is not executed.

In such a recording system, a recording operation of performing recording on a medium by ejecting a liquid from the liquid ejection head can be executed. In such a recording system, in a recording job, a maintenance operation of performing maintenance on the liquid ejection head can be executed by ejecting a liquid from the liquid ejection head. The cap is displaced to a separation position away from the liquid ejection head during execution of the recording operation, and displaced to a contact position where the cap contacts the liquid ejection head during execution of the maintenance operation.

In such a recording system, in a recording job for performing recording on a predetermined number of media, the cap is displaced from the contact position to the separation position before the execution of the recording operation, and after a defined time has elapsed with reference to that displacement, the recording operation is stopped and the maintenance operation is performed. In addition to this, the recording operation is stopped to adjust a medium transport time in accordance with an execution timing of the post-processing operation, but the maintenance operation may be executed in association with the stoppage of the recording operation. Consequently, by adjusting the execution timing of the maintenance operation, it is possible to improve a processing speed without degrading the recording quality on a medium.

However, in such a recording system, there is a demand for further improving the processing speed, and there is room for improvement in execution timings of a recording operation, a maintenance operation, and a post-processing operation.

SUMMARY

According to the present disclosure, there is provided a recording system including a transport section configured to transport a medium along a transport path; a liquid ejection head configured to execute a recording operation of performing recording on the medium by ejecting a liquid onto the medium; a cap configured to be displaced between a separation position separated from the liquid ejection head and a maintenance position for performing maintenance on the liquid ejection head; a processing tray configured to place thereon the medium subjected to recording by the liquid ejection head; a post-processing section configured to execute a post-processing operation on the medium placed on the processing tray; and a control section, in which the control section is configured to measure a time with reference to displacement of the cap from the maintenance position to the separation position, the liquid ejection head is configured to execute the recording operation in a state in which the cap is located at the separation position in a recording job for performing recording on a predetermined number of media, and to execute a maintenance operation in which the liquid is ejected in a state in which the cap is located at the maintenance position when a time measured by the control section exceeds a defined time, the transport path has a standby position at which the medium is configured to wait upstream of the liquid ejection head, the transport section is configured to cause a first medium to wait at the standby position before start of the recording operation in the recording job, the cap is located at the separation position when the first medium in the recording job is waiting at the standby position before the start of the recording operation in the recording job, and the control section, during an initial control period among control periods associated with the recording job, causes the liquid ejection head to execute the maintenance operation and also causes the post-processing section to execute the post-processing operation on a second number of media smaller than a first number of media, and after end of the initial control period, causes the liquid ejection head to execute the maintenance operation and also causes the post-processing section to execute the post-processing operation on the first number of media.

According to the present disclosure, there is provided a control method for a recording system including a transport section configured to transport a medium along a transport path, a liquid ejection head configured to execute a recording operation of performing recording on the medium by ejecting a liquid onto the medium, a cap configured to be displaced between a separation position separated from the liquid ejection head and a maintenance position for performing maintenance on the liquid ejection head, a processing tray configured to place thereon the medium subjected to recording by the liquid ejection head, and a post-processing section configured to execute a post-processing operation on the medium placed on the processing tray, the transport path being a path having a standby position at which the medium is configured to wait upstream of the liquid ejection head, the control method including measuring a time with reference to displacement of the cap from the maintenance position to the separation position; causing the liquid ejection head to execute the recording operation in a state in which the cap is located at the separation position in a recording job in which the liquid ejection head executes recording on a predetermined number of media; causing the liquid ejection head to execute a maintenance operation in which the liquid is ejected in a state in which the cap is located at the maintenance position when the measured time exceeds a defined time; causing the transport section to cause a first medium to wait at the standby position before start of the recording operation in the recording job; locating the cap at the separation position when the first medium in the recording job is waiting at the standby position before the start of the recording operation in the recording job; during an initial control period among control periods associated with the recording job, causing the liquid ejection head to execute the maintenance operation and also causing the post-processing section to execute the post-processing operation on a second number of media smaller than a first number of media; and after end of the initial control period, causing the liquid ejection head to execute the maintenance operation and also causing the post-processing section to execute the post-processing operation on the first number of media.

BRIEF DESCRIPTION OF THE DRAWINGS

FIG. 6 is a schematic diagram illustrating a relationship between a mode, each stage, and the number of sheets to be processed.

DESCRIPTION OF EXEMPLARY EMBODIMENTS

First Embodiment

Hereinafter, an embodiment of a recording system will be described. The recording system executes, for example, a recording operation of performing recording on a medium 12 and a post-processing operation of performing post-processing on the recorded medium 12.

Configuration of Recording System

Figure 1:
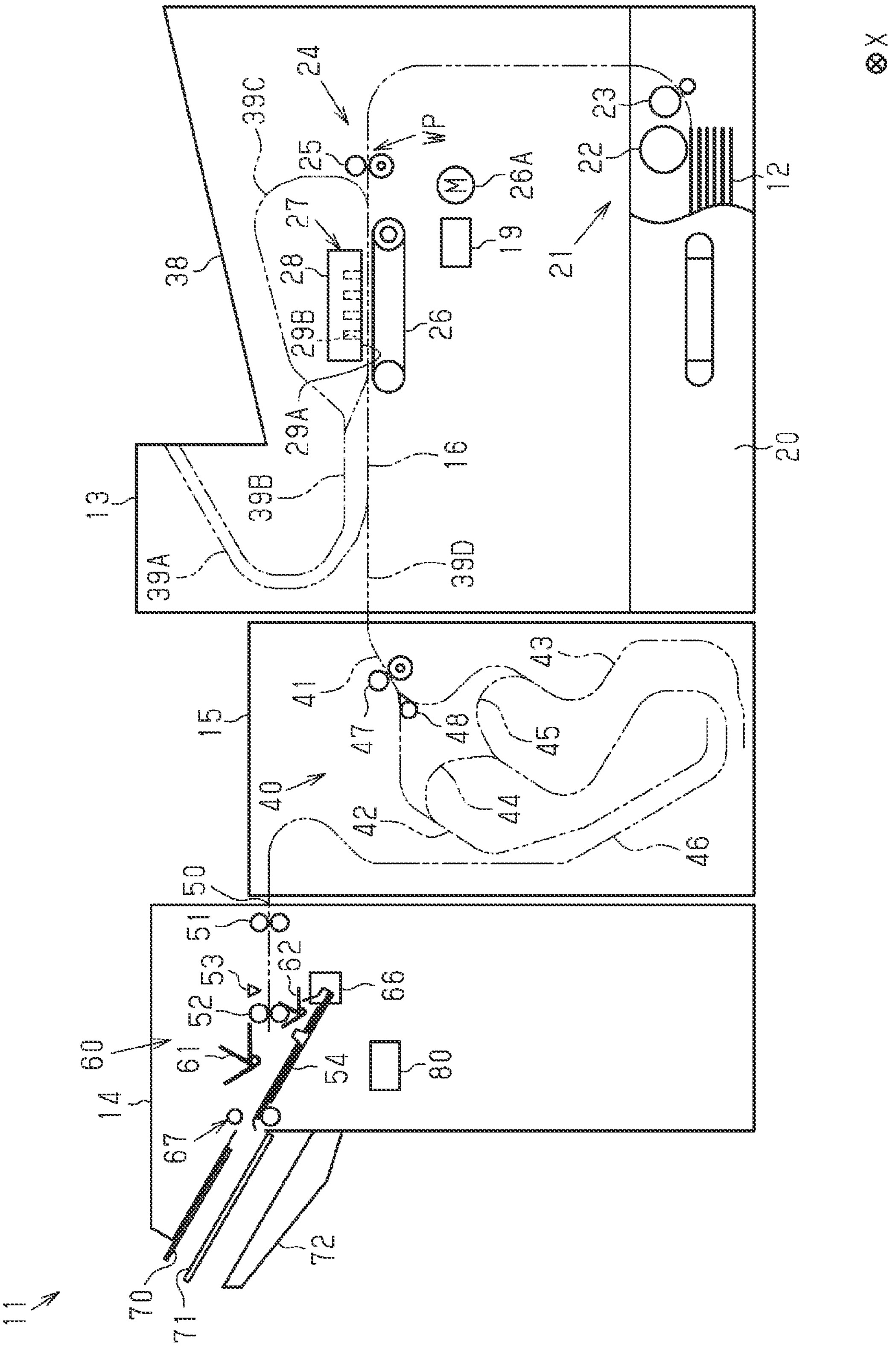
FIG. 1 is a side view schematically illustrating a recording system.

As illustrated in FIG. 1, a recording system 11 includes a recording device 13 that performs recording on a medium 12. The recording system 11 includes a post-processing device 14. The post-processing device 14 performs post-processing on the medium 12 subjected to the recording by the recording device 13. The recording system 11 may include an intermediate device 15. The intermediate device 15 is disposed between the recording device 13 and the post-processing device 14. The intermediate device 15 transports the medium 12 subjected to the recording by the recording device 13 to the post-processing device 14.

The recording system 11 has a transport path 16. The transport path 16 is a path that extends from the recording device 13 to the post-processing device 14 via the intermediate device 15. The recording system 11 includes a plurality of transport roller pairs. The plurality of transport roller pairs transport the medium 12 along the transport path 16. At least one transport roller pair is provided in each of the recording device 13, the intermediate device 15, and the post-processing device 14, for example. In the present embodiment, a width direction of the medium 12 is indicated as a width direction X.

Configuration of Recording Device 13

The recording device 13 is configured to perform recording on the medium 12. The recording device 13 of the present embodiment may be an ink jet printer. An ink jet printer is a printer that records an image on the medium 12 by ejecting ink that is an example of a liquid onto the medium 12. Images include photographs, designs, characters, symbols, marks, lines, tables, and the like.

The recording device 13 includes a cassette 20. The cassette 20 accommodates the media 12 in a stacked state. The cassette 20 is detachably attached to the recording device 13. A plurality of cassettes 20 may be provided.

The recording device 13 includes a paper feeding section 21. The paper feeding section 21 is configured to feed the medium 12 to a recording section 27. The paper feeding section 21 sends out the medium 12 accommodated in the cassette 20 to the transport path 16. The paper feeding section 21 may include a pickup roller 22 and a separation roller 23. The pickup roller 22 sends out the uppermost medium 12 among the media 12 accommodated in the cassette 20. The separation roller 23 separates the medium 12 sent out by the pickup roller 22 sheet by sheet.

The recording device 13 includes a transport section 24. The transport section 24 transports the medium 12 fed by the paper feeding section 21 along the transport path 16. The transport section 24 is configured to transport the medium 12 recorded by the recording section 27. The transport section 24 includes a plurality of first transport roller pairs 25. The plurality of first transport roller pairs 25 are transport roller pairs provided in the recording device 13. The plurality of first transport roller pairs 25 are disposed along the transport path 16. In FIG. 1, one of the plurality of first transport roller pairs 25 is illustrated as a representative. The plurality of first transport roller pairs 25 transport the medium 12 sent out from the cassette 20 along the transport path 16 inside the recording device 13.

The recording device 13 has a support portion 26. The support portion 26 is provided at a position along the transport path 16. The support portion 26 is configured to support the medium 12. The support portion 26 is movable between a support position and a retracted position. The support position is a position where the support portion 26 can support the medium 12. The retracted position is a position where the support portion 26 does not support the medium 12. The recording device 13 includes a drive motor 26A. The drive motor 26A is a drive source for moving the support portion 26 between the support position and the retracted position.

The recording device 13 has a recording section 27. The recording section 27 is configured to perform recording on the medium 12. The recording section 27 is provided at a position facing the support portion 26 with the transport path 16 interposed therebetween. The recording section 27 includes a liquid ejection head 28. The liquid ejection head 28 is configured to eject a liquid. The liquid ejection head 28 has a nozzle surface 29A and a plurality of nozzles 29B. The nozzle surface 29A faces the support portion 26. The plurality of nozzles 29B are formed on the nozzle surface 29A. The plurality of nozzles 29B eject the liquid. The liquid ejection head 28 performs recording on the medium 12 by ejecting the liquid from the plurality of nozzles 29B toward the medium 12 supported by the support portion 26.

The liquid ejection head 28 of the present embodiment is, for example, a line head that includes a plurality of nozzles 29B arranged at a constant pitch in the width direction X and capable of simultaneously ejecting the liquid across the width of the medium 12. The liquid ejection head 28 may be a serial head that is mounted on a carriage that reciprocates in the width direction X and that ejects the liquid from the plurality of nozzles 29B while being moved along with the carriage.

The transport path 16 also includes a standby position WP. The standby position WP is located upstream of the liquid ejection head 28 in the transport path 16. As described above, the transport path 16 has the standby position WP where the medium 12 can wait upstream of the liquid ejection head 28. The standby position WP is a position where the medium 12 can be made to wait before a recording operation is executed.

Figure 2:
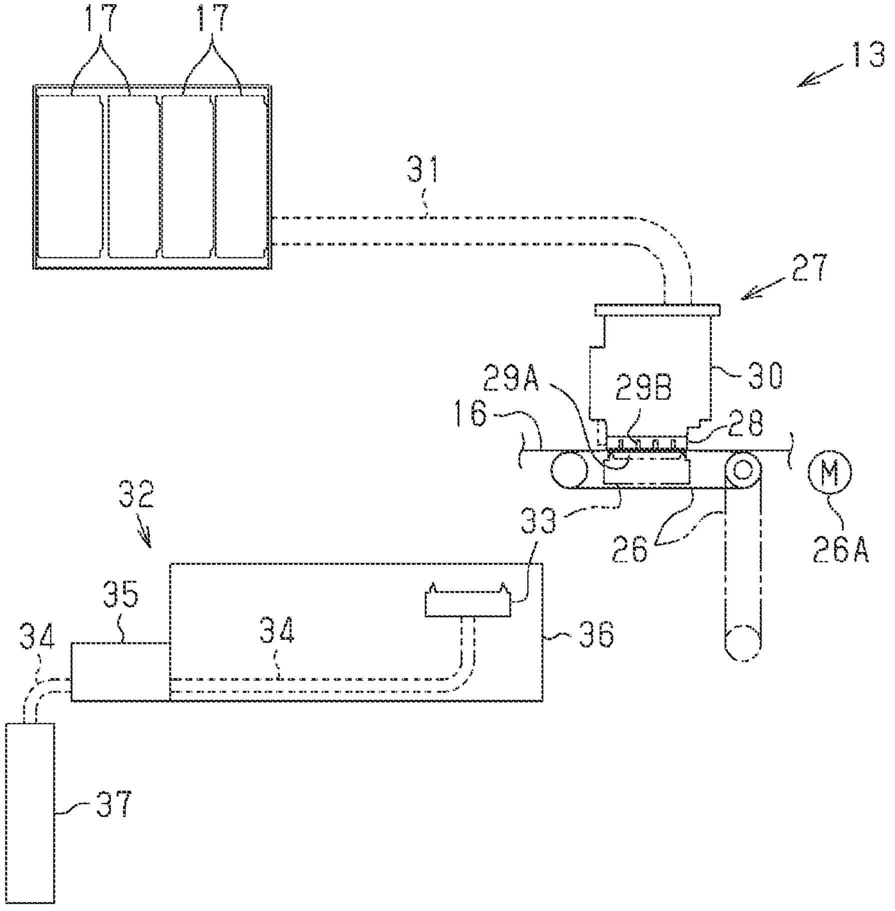
FIG. 2 is a schematic diagram illustrating a recording device.

As illustrated in FIG. 2, the recording section 27 has a holding portion 30. The holding portion 30 holds the liquid ejection head 28. The recording section 27 includes a supply channel 31. The supply channel 31 is a channel for supplying the liquid contained in the liquid container 17 to the liquid ejection head 28.

The recording device 13 has a maintenance section 32. The maintenance section 32 executes a maintenance operation for performing maintenance of the liquid ejection head 28. The maintenance section 32 may perform flushing or cleaning as the maintenance of the liquid ejection head 28. The flushing refers to ejecting the liquid unrelated to recording from a plurality of nozzles 29B. The cleaning means that the liquid is forced to be discharged from the plurality of nozzles 29B.

The maintenance section 32 has a cap 33. The cap 33 can cap the nozzle surface 29A. The cap 33 is movable between a contact position and a separation position. That is, the cap 33 can be displaced between the separation position and the contact position. The contact position is indicated by a two-dot chain line in FIG. 2, and is a position of contacting the nozzle surface 29A. The separation position is a position indicated by a solid line in FIG. 2, and is a position of being separated from the nozzle surface 29A.

When the cap 33 is disposed at the contact position, the contact with the nozzle surface 29A forms a closed space in which the plurality of nozzles 29B are opened. Thus, the cap 33 protects the liquid ejection head 28 by coming into contact with the liquid ejection head 28. When the cap 33 is disposed at the separation position, the separation from the nozzle surface 29A allows the liquid to be ejected from the plurality of nozzles 29B onto the medium 12.

The maintenance section 32 includes a waste liquid channel 34, a suction pump 35, a moving portion 36 and a waste liquid container 37. The waste liquid channel 34 is a channel that couples the cap 33 to a waste liquid container 37. A suction pump 35 is a pump for applying a negative pressure to the plurality of nozzles 29B during cleaning. The suction pump 35 is provided in the middle of a waste liquid channel 34. The moving portion 36 moves the cap 33 between the separation position and the contact position. The waste liquid container 37 can contain the liquid contained in the cap 33.

In particular, after the support portion 26 has been moved from the support position to the separation position in association with the start of the maintenance operation, the moving portion 36 moves the cap 33 from the separation position to the contact position. As described above, the time is required to move the support portion 26 and the cap 33 in association with the start of the maintenance operation.

In association with the start of the recording operation, the moving portion 36 moves the cap 33 from the contact position to the separation position. Thereafter, the support portion 26 is moved from the retracted position to the support position. As described above, the time is required to move the support portion 26 and the cap 33 in association with the start of the recording operation.

A main condition for flushing is that a defined time has elapsed after movement of the cap 33 from the contact position to the separation position. In the flushing, the intensity of maintenance may be varied by varying a liquid ejection amount and a processing time. As a specific example, the flushing includes strong flushing and weak flushing. In the weak flushing, a maintenance intensity is lower than in the strong flushing.

Specifically, in the weak flushing, a liquid ejection amount is smaller and a processing time is shorter than in the strong flushing.

As illustrated in FIG. 1, the recording device 13 has a placement tray 38. The medium 12 discharged from the inside of the recording device 13 is placed on the placement tray 38. The recording device 13 includes, as a part of the transport path 16, a first discharge path 39A, a switchback path 39B, a reverse path 39C, and a second discharge path 39D. The first discharge path 39A is a path through which the medium 12 is discharged. The medium 12 discharged from the first discharge path 39A is placed on the placement tray 38. The switchback path 39B is a path through which the medium 12 is transported switchback. The reverse path 39C is a path through which the medium 12 is turned upside down. The second discharge path 39D is a path through which the medium 12 is discharged. The medium 12 discharged from the second discharge path 39D is carried out to the intermediate device 15. As described above, the medium 12 subjected to recording by the liquid ejection head 28 is discharged to the placement tray 38 through the first discharge path 39A, or carried out toward the intermediate device 15 through the second discharge path 39D.

When double-sided recording is performed, the medium 12 of which one side is subjected to recording is switched back on the switchback path 39B after being transported to the switchback path 39B. Consequently, the medium 12 of which one side is subjected to recording is transported from the switchback path 39B to the reverse path 39C. The medium 12 reversed on the reverse path 39C is transported to the liquid ejection head 28 again, and then recording is performed on the opposite side to the side already subjected to recording by the liquid ejection head 28. As described above, the recording device 13 performs double-sided recording on the medium 12.

The recording device 13 includes a recording control section 19. The recording control section 19 may comprehensively control driving of each mechanism in the recording device 13 and control various operations executed in the recording device 13. The recording control section 19 may include one or more processors that execute various processes according to a computer program, one or more dedicated hardware circuits such as application-specific integrated circuits that execute at least some of the various processes, or combinations thereof. The processor includes a CPU and a memory. The memory, such as RAM and ROM, stores program codes or instructions configured to cause the CPU to execute processes. The memory, that is, a computer-readable medium includes any readable media that can be accessed by a general purpose or special purpose computer.

When recording job information is input from a terminal apparatus (not illustrated), the recording control section 19 performs recording on the medium 12 based on the recording job information. The recording job information is information that can specify at least execution of a recording job. The recording job indicates a series of operations for performing recording on at least a predetermined number of the media 12. This predetermined number may be one or more.

The recording job information includes image data to be recorded on the medium 12. The recording job information includes medium type information. The medium type information is information that can specify the type of the medium 12 to be subjected to recording. The type of medium 12 includes a size of medium 12. The recording job information includes total recording number information. The total recording number information is information that can specify a total recording number of the media 12 to be subjected to recording.

The recording job information includes post-processing related information. The post-processing related information is information related to post-processing, and is information that can specify whether or not recording is associated with post-processing and the type of post-processing. The recording job information includes mode information. The mode information is information that can specify a mode controlled in the recording job. The mode is control information regarding recording on the medium 12 and post-processing of the medium 12 after recording.

The recording control section 19 can communicate with the intermediate device 15 via a communication section (not illustrated). The recording control section 19 can communicate with the post-processing device 14 via a communication section (not illustrated). In the present embodiment, the recording control section 19 may transmit post-processing information regarding post-processing to the post-processing device 14 when recording job information for recording associated with post-processing is input.

The post-processing information includes medium type information. The post-processing information includes total recording number information. The post-processing information includes post-processing related information. The post-processing information includes mode information. As described above, the recording control section 19 that is an example of a control section is configured to perform at least control regarding recording on the medium 12 as predetermined control.

Configuration of Intermediate Device 15

The intermediate device 15 is a device that discharges the medium 12 after recording carried in from the recording device 13 to the post-processing device 14. The intermediate device 15 may include a reverse processing section 40. The reverse processing section 40 reverses the carried-in medium 12.

As a part of the transport path 16, the reverse processing section 40 may include a first introduction path 41, a first switchback path 42, a second switchback path 43, a first merging path 44, a second merging path 45, and an extraction path 46.

The reverse processing section 40 may include a plurality of second transport roller pairs 47. A plurality of second transport roller pairs 47 are transport roller pairs provided in the intermediate device 15. The plurality of second transport roller pairs 47 are disposed along the transport path 16. In FIG. 1, one of the plurality of second transport roller pairs 47 is illustrated as a representative.

The reverse processing section 40 may include a flap 48. The flap 48 is a branch point where the first introduction path 41 branches into the first switchback path 42 and the second switchback path 43, and the medium 12 is guided to either the first switchback path 42 or the second switchback path 43. As described above, the flap 48 switches a transport destination of the medium 12 transported from the first introduction path 41 between the first switchback path 42 and the second switchback path 43.

The medium 12 transported to the first switchback path 42 is switched back on the first switchback path 42, reversed on the first merging path 44, and then transported to the extraction path 46. On the other hand, the medium 12 transported from the first introduction path 41 to the second switchback path 43 is switched back on the second switchback path 43, reversed on the second merging path 45, and then transported to the extraction path 46. The intermediate device 15 can, for example, cause the media 12 to alternately carry into the first switchback path 42 and the second switchback path 43.

Configuration of Post-Processing Device 14

The post-processing device 14 is a device that performs post-processing on the medium 12 after recording carried in from the intermediate device 15. That is, the post-processing device 14 is configured to receive the medium 12 subjected to recording by the recording device 13 and to perform post-processing on the received medium 12.

The post-processing device 14 has a receiving section 50. The receiving section 50 is provided on the transport path 16. The receiving section 50 is configured to receive the medium 12 carried in from intermediate device 15. As described above, the receiving section 50 can receive the medium 12 subjected to recording by the recording device 13.

The post-processing device 14 may include a third transport roller pair 51. The third transport roller pair 51 is a transport roller pair provided in the post-processing device 14. The third transport roller pair 51 is disposed along the transport path 16. The third transport roller pair 51 is configured to transport the recorded medium 12 after recording received by the receiving section 50.

The post-processing device 14 may include a fourth transport roller pair 52. The fourth transport roller pair 52 is a transport roller pair provided in the post-processing device 14. The fourth transport roller pair 52 is provided at the end of the transport path 16.

The post-processing device 14 has a sensor 53. The sensor 53 is disposed between the third transport roller pair 51 and the fourth transport roller pair 52 on the transport path 16. In other words, the sensor 53 is disposed upstream of the fourth transport roller pair 52. The sensor 53 detects a leading edge and a trailing edge of the carried-in medium 12.

In the present embodiment, the post-processing device 14 transports the medium 12 at a predetermined transport speed on the transport path 16 inside the post-processing device 14. In the present embodiment, when the trailing edge of the medium 12 passes through the fourth transport roller pair 52, the medium 12 drops from the fourth transport roller pair 52.

Figure 3:
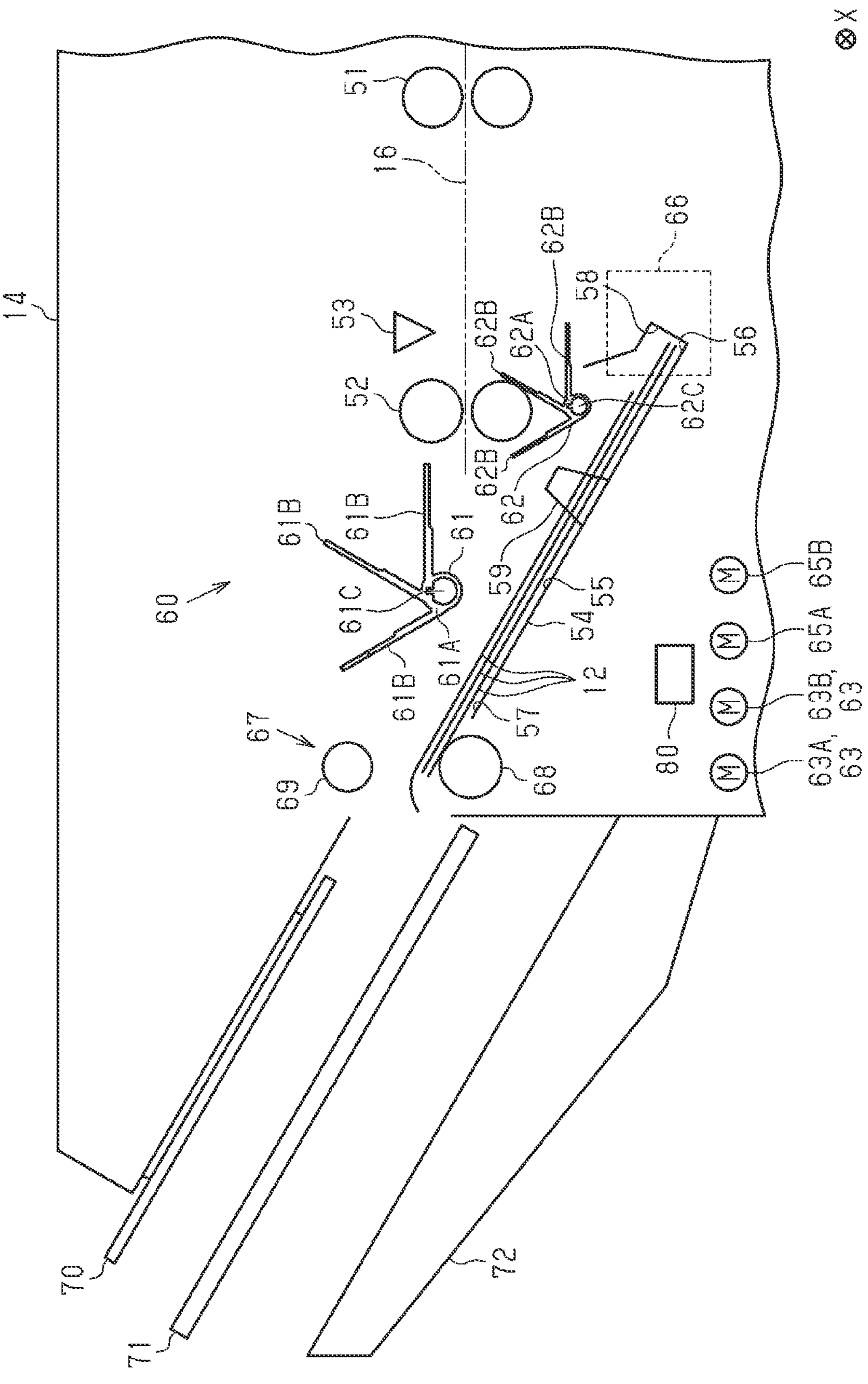
FIG. 3 is an enlarged view of FIG. 1 illustrating a post-processing device.

As illustrated in FIG. 3, the post-processing device 14 has a processing tray 54. The processing tray 54 is a tray on which the medium 12 transported by the third transport roller pair 51 and the fourth transport roller pair 52 is placed. That is, the processing tray 54 is a tray on which the medium 12 after recording subjected to recording by the recording section 27 of the recording device 13 can be placed. The processing tray 54 can place the media 12 to be post-processed thereon.

The processing tray 54 is located below the fourth transport roller pair 52. The processing tray 54 receives the medium 12 dropping from the fourth transport roller pair 52. Consequently, the medium 12 is placed on the processing tray 54. In this case, the medium 12 may be placed on the processing tray 54 such that the leading edge of the medium 12 protrudes from the processing tray 54.

The processing tray 54 has a placement surface 55. The placement surface 55 is a surface on which the medium 12 is placed. The placement surface 55 has a first placement end 56 and a second placement end 57 opposite the first placement end 56. The placement surface 55 is inclined to extend upward from the first placement end 56 toward the second placement end 57. That is, the first placement end 56 is located below the second placement end 57.

The post-processing device 14 includes a first alignment portion 58. The first alignment portion 58 is continuous with the first placement end 56 of the processing tray 54. The first alignment portion 58 has a surface against which the trailing edge of the medium 12 placed on the processing tray 54 abuts. In the present embodiment, the placement surface 55 is inclined to extend upward from the first placement end 56 to the second placement end 57. The processing tray 54 has a smaller coefficient of friction than that of the medium 12 placed thereon. Thus, the medium 12 placed on the placement surface 55 is likely to slide toward the first alignment portion 58 due to the action of gravity, and the trailing edge of the medium 12 is likely to abut against the first alignment portion 58. When the trailing edge of the medium 12 abuts against the first alignment portion 58, the trailing edges of the media 12 are aligned with the first alignment portion 58 as a reference. In particular, when a plurality of the media 12 to be placed have the same size, the leading edges of the media 12 are also aligned due to the trailing edges of the media 12 being aligned.

The post-processing device 14 may include a pair of second alignment portions 59 arranged in the width direction X. The second alignment portion 59 may be, for example, an edge guide. The pair of second alignment portions 59 are provided on the processing tray 54. The pair of second alignment portions 59 is configured to be movable in the width direction X. The pair of second alignment portions 59 can widen or narrow a gap therebetween by being moved. The pair of second alignment portions 59 align both side edges of the medium 12 due to both side edges of the medium 12 placed on the placement surface 55 contacting each other. The side edges of the medium 12 are two edges of the rectangular medium 12 excluding the leading edge and the trailing edge. As described above, the pair of second alignment portions 59 can align both side edges of the medium 12 placed on the processing tray 54.

The post-processing device 14 may include a first paddle 61 and a second paddle 62. The first paddle 61 and the second paddle 62 are configured to transport the medium 12 placed on the processing tray 54 toward the first alignment portion 58.

The first paddle 61 includes a first paddle rotation body 61A, a first blade 61B, and a first paddle rotation shaft 61C. The first paddle rotation body 61A is supported by the first paddle rotation shaft 61C. The first paddle rotation body 61A rotates counterclockwise in FIG. 2 about the first paddle rotation shaft 61C. The first paddle rotation shaft 61C extends in the width direction X.

The first blade 61B extends outward from the first paddle rotation body 61A. One or more first blades 61B are provided. The first blade 61B is made of, for example, an elastic material such as rubber or elastomer. The first blade 61B is provided in a plate shape, for example.

The first blade 61B is curved due to rotation of the first paddle rotation body 61A while the tip of the first blade 61B is in contact with the upper surface of the medium 12 placed on the processing tray 54. A frictional force is generated between the tip of the first blade 61B and the upper surface of the medium 12 due to the reaction force of this curving. The first paddle 61 transports the medium 12 toward the first placement end 56 due to the frictional force between the tip of the first blade 61B and the upper surface of the medium 12.

The second paddle 62 includes a second paddle rotation body 62A, a second blade 62B, and a second paddle rotation shaft 62C. The second paddle 62 is smaller in size than the first paddle 61 but has the same configuration as that of the first paddle 61.

The post-processing device 14 includes a first transport motor 63A and a second transport motor 63B. The first transport motor 63A is a drive source for rotating the first paddle 61. The second transport motor 63B is a drive source for rotating the second paddle 62. Hereinafter, the first transport motor 63A and the second transport motor 63B may be collectively referred to as the transport motor 63.

The post-processing device 14 includes a post-processing section 60. The post-processing section 60 is configured to perform post-processing on the medium 12 placed on the processing tray 54. That is, the post-processing section 60 is configured to perform post-processing on the medium 12 received by the receiving section 50. The post-processing may be, for example, a binding process, but may also be a punching process, a folding process, a shift process, and a stacking process in addition to the binding process. The binding process is a process of binding a plurality of the media 12 and then discharging the media 12. The punching process is a process of punching one or a plurality of the media 12 and then discharging the media 12. The folding process is a process of folding the medium 12 and then discharging the medium 12. The shift process is a process of shifting a position of the media 12 for each set and discharging the media 12. The stacking process is a process of discharging a plurality of the media 12 as a medium bundle without shifting a position of each set, and a process of discharging a single medium 12 without shifting the medium 12.

The post-processing section 60 may include a paper binding device 66. The paper binding device 66 binds a plurality of the media 12. The post-processing section 60 may be provided with, for example, a punching device or a folding device instead of the paper binding device 66.

The post-processing section 60 may include a discharge portion 67. The discharge portion 67 includes, for example, a discharge driving roller 68 and a discharge driven roller 69. The discharge driving roller 68 contacts the medium 12 placed on the processing tray 54 from below. The discharge driven roller 69 is located above the discharge driving roller 68. In the present embodiment, the discharge driven roller 69 is configured to be movable. The discharge driven roller 69 is movable between a nip position approaching the discharge driving roller 68 and a retracted position away from the discharge driving roller 68. The discharge driven roller 69 contacts the medium 12 by approaching the discharge driving roller 68. In this case, the discharge driven roller 69 contacts the medium 12 placed on the processing tray 54 from above.

The discharge portion 67 discharges the medium 12 placed on the processing tray 54 by rotating the discharge driving roller 68 in a state in which the medium 12 is pinched between the discharge driving roller 68 and the discharge driven roller 69. As described above, the discharge portion 67 discharges the post-processed medium 12 from the processing tray 54.

The discharge portion 67 includes a nip motor 65A. The nip motor 65A is a drive source for moving the discharge driven roller 69. The discharge portion 67 includes a discharge motor 65B. The discharge motor 65B is a drive source for rotating the discharge driving roller 68.

The post-processing device 14 may include a guide portion 70, a pair of support members 71 and a discharge tray 72. The guide portion 70 is provided in a plate shape, for example. The guide portion 70 suppresses upward displacement of the medium 12 by contacting the medium 12 discharged by the discharge portion 67.

The pair of support members 71 are located below the guide portion 70. The pair of support members 71 are arranged in the width direction X. The pair of support members 71 temporarily support the medium 12 discharged by the discharge portion 67. The pair of support members 71 support the medium 12 by contacting side edge portions of the medium 12. The pair of support members 71 are configured to be movable in the width direction X. That is, a gap between the pair of support members 71 can be widened or narrowed. The pair of support members 71 support the side edge portions of the medium 12 by aligning the gap therebetween with the width of the medium 12. The pair of support members 71 cause the supported medium 12 to drop by increasing the gap therebetween while supporting the medium 12. The pair of support members 71 is not limited to a case where the medium 12 is discharged from the processing tray 54 by the discharge portion 67, and may support the leading edge of the medium 12 when the medium 12 drops from the fourth transport roller pair 52 to the processing tray 54.

The discharge tray 72 is located below the pair of support members 71. The medium 12 dropping from the pair of support members 71 is placed on the discharge tray 72. The discharge tray 72 may move up and down according to an amount of placed media 12.

The post-processing device 14 includes a post-processing control section 80. The post-processing control section 80 may centrally control the driving of each mechanism in the post-processing device 14 and control various operations executed in the post-processing device 14. The post-processing control section 80 may include one or more processors that execute various processes according to a computer program, one or more dedicated hardware circuits such as application-specific integrated circuits that execute at least some of the various processes, or a combination thereof. The processor includes a CPU and a memory. The memory, such as RAM and ROM, stores program codes or instructions configured to cause the CPU to execute processes. The memory, that is, a computer-readable medium includes any readable media that can be accessed by a general purpose or special purpose computer.

In particular, the post-processing control section 80 can communicate with the recording device 13 via a communication section (not illustrated). The post-processing control section 80 can detect the leading edge and the trailing edge of the carried-in medium 12 based on a signal from the sensor 53. The post-processing control section 80 can rotate the first paddle 61 and the second paddle 62 by driving the transport motor 63. The post-processing control section 80 can cause the post-processing section 60 to perform post-processing. In particular, the post-processing control section 80 can move the discharge driven roller 69 by driving the nip motor 65A. The post-processing control section 80 can rotate the discharge driving roller 68 by driving the discharge motor 65B. As described above, the post-processing control section 80 can control the post-processing device 14 to perform at least control related to the post-processing.

Mode

In the present embodiment, the recording system 11 can perform control in one of a plurality of modes. The plurality of modes may be modes based on recording job information. The plurality of modes include a first mode and a second mode. The first mode and the second mode are modes in which recording associated with post-processing is performed, and a stacking process is performed as the type of post-processing. The first mode is a mode in which a timing of a recording operation and a timing of a post-processing operation for the first medium 12 in a recording job are advanced compared with the second mode, with reference to the start of the recording job. In other words, the first mode is a mode for improving a processing speed of the first medium 12 in the recording job compared with the second mode. Hereinafter, the number of the media 12 may be indicated as the number of sheets with reference to the start of the recording job.

After recording job information is input, the recording job is started. When the recording job is started, image processing is performed on image data included in the recording job information. In particular, the first mode is a mode in which the first medium 12 waits at standby position WP while the image processing on the image data is being performed by transporting the first medium 12 from the cassette 20 to the standby position WP. The second mode is a mode in which the first medium 12 is transported from the cassette 20 after the image processing on the image data is ended. As described above, the first mode is a mode in which the start timing of recording on the first medium 12 can be advanced with reference to the start of the recording job compared with the second mode.

The first mode is a mode in which the cap 33 is moved from the contact position to the separation position when image processing on image data is started. The second mode is a mode in which the cap 33 is moved from the contact position to the separation position after the image processing on the image data is ended. As described above, the first mode is a mode in which, by advancing the start timing of recording on the first medium 12 with reference to the start of the recording job, a timing of moving the cap 33 from the contact position to the separation position is also earlier than in the second mode.

The first mode is a mode in which the support portion 26 is moved from the retracted position to the support position when image processing on image data is started. The second mode is a mode in which the support portion 26 is moved from the retracted position to the support position after the image processing on the image data is ended. As described above, the first mode is a mode in which, by advancing the start timing of recording on the first medium 12 with reference to the start of the recording job, a timing of moving the support portion 26 from the retracted position to the support position is also earlier than in the second mode.

The first mode is a mode in which, when the first medium 12 is placed on the processing tray 54, the first medium 12 is discharged from the processing tray 54 without waiting for the second and subsequent media 12. The first mode is a mode in which a plurality of the media 12 are discharged as a medium bundle from the processing tray 54 for the second and subsequent media 12 in the recording job. The second mode is a mode in which, after the first medium 12 is placed on the processing tray 54, the second and subsequent media 12 are waited for, and a plurality of the media 12 are discharged from the processing tray 54 as a medium bundle.

As described above, the first mode is a mode in which a discharge timing of the first medium 12 can be advanced compared with the second mode. Consequently, the first mode is a mode in which a timing at which the first medium 12 can be checked can be advanced compared with the second mode, with reference to the start of the recording job.

Recording Control Process

Next, a recording control process will be described with reference to FIG. 4. The recording control process is a process executed by the recording control section 19 of the recording device 13 when recording job information that can specify the first mode or recording job information that can specify the second mode is input.

In step S11, the recording control section 19 starts image processing based on the input recording job information. The image processing is a process of generating recording data based on image data included in the input recording job information. The image processing is a process that is executed in a process different from the recording control process when started in step S11. Therefore, after the image processing is started in step S11, the recording control section 19 can execute steps S12 to S17 in parallel even while the image processing is being executed. When this process is ended, the recording control section 19 causes the process to proceed to step S12.

In step S12, the recording control section 19 determines whether or not control is to be performed in the first mode based on the recording job information. When the recording control section 19 determines that the control is to be performed in the first mode, the process proceeds to step S13. When the recording control section 19 determines that control is not to be performed in the first mode, the process proceeds to step S17. That is, when the recording control section 19 determines that the control is to be performed in the second mode, the process proceeds to step S17.

In step S13, the recording control section 19 executes a cap separation process. In this process, the moving portion 36 is controlled to move the cap 33 from the contact position to the separation position. Consequently, the cap 33 changes from a state of contacting the liquid ejection head 28 to a state of being separated from the liquid ejection head 28. The recording control section 19 controls the drive motor 26A to move the support portion 26 from the retracted position to the support position. When this process is ended, the recording control section 19 causes the process to proceed to step S14.

In step S14, the recording control section 19 executes a measurement start process. In this process, the recording control section 19 starts measuring the time required to perform a maintenance operation when the cap 33 is moved from the contact position to the separation position. In this case, the recording control section 19 sets a value indicating a defined time in a maintenance time counter. The maintenance time counter is assigned to a memory of the recording control section 19. The maintenance time counter is a counter for specifying that a defined time has passed after movement of the cap 33 from the contact position to the separation position. In a process different from the recording control process, the recording control section 19 may update the maintenance time counter in a predetermined cycle to determine whether or not a defined time has elapsed after movement of the cap 33 from the contact position to the separation position. As described above, the recording control section 19 can measure time with reference to displacement of the cap 33 from the contact position to the separation position. When this process is ended, the recording control section 19 causes the process to proceed to step S15.

In step S15, the recording control section 19 executes an initial transport process. The recording control section 19 controls the paper feeding section 21 to feed the medium 12 in the cassette 20 before executing a recording operation based on the recording job information. The recording control section 19 also controls the transport section 24 to transport the fed medium 12 to the standby position WP along the transport path 16.

As described above, the recording control section 19 causes the first medium 12 to wait upstream of the liquid ejection head 28 before executing the recording operation based on the recording job information. In other words, in the first mode, the transport section 24 can cause the first medium 12 to wait at the standby position WP before starting the recording operation in the recording job. In this case, the cap separation process is executed in step S13, and in the first mode, the cap 33 is located at the separation position when the first medium 12 in the recording job is waiting at the standby position WP before the recording operation in the recording job is started. When this process is ended, the recording control section 19 causes the process to proceed to step S16.

In step S16, the recording control section 19 determines whether or not a recording start condition is established. The recording start condition may be established when a predetermined time has passed after input of the recording job information. The predetermined time may be sufficient time until the image processing is ended. When the recording control section 19 determines that the recording start condition is not established, the process proceeds to step S16 again. When the recording control section 19 determines that the recording start condition is established, the process proceeds to step S18. As described above, the recording control section 19 repeatedly performs the determination in step S16 until the recording start condition is established, and when the recording start condition is established, the process proceeds to step S18.

In step S18, the recording control section 19 executes an initial recording process. In this process, the recording control section 19 controls the transport section 24 to transport the first medium 12 at the standby position WP along the transport path 16. The recording control section 19 performs recording on the medium 12 by ejecting a liquid from the liquid ejection head 28. That is, the initial recording process is a process of executing a recording operation on the medium 12 previously transported to the standby position WP.

As described above, the recording control section 19 can cause the liquid ejection head 28 to perform a recording operation in a state in which the cap 33 is located at the separation position in a recording job for performing recording on a predetermined number of the media 12. In other words, the liquid ejection head 28 can execute a recording operation in a state in which the cap 33 is located at the separation position in the recording job for performing recording on a predetermined number of the media 12.

The recording control section 19 counts the number of recording sheets of the media 12 subjected to recording in the recording job by updating the recording number counter in association with the execution of the initial recording process. The recording number counter is assigned to the memory of the recording control section 19. The recording number counter is a counter for specifying the number of recording sheets of the media 12 subjected to recording in one recording job. When this process is ended, the recording control section 19 causes the process to proceed to step S21.

On the other hand, in step S17, the recording control section 19 determines whether or not the recording start condition is established in the same manner as in step S16. When the recording control section 19 determines that the recording start condition is not established, the process proceeds to step S17 again. When the recording control section 19 determines that the recording start condition is established, the process proceeds to step S19.

In step S19, the recording control section 19 executes the cap separation process in the same manner as in step S13. When this process is ended, the recording control section 19 causes the process to proceed to step S20.

In step S20, the recording control section 19 executes a measurement start process in the same manner as in step S14. When this process is ended, the recording control section 19 causes the process to proceed to step S21.

In step S21, the recording control section 19 executes a normal recording process. In this process, the recording control section 19 controls the paper feeding section 21 to feed the medium 12 in the cassette 20, and controls the transport section 24 to transport the fed medium 12 along the transport path 16. The recording control section 19 performs recording on the medium 12 by ejecting a liquid from the liquid ejection head 28.

The recording control section 19 counts the number of recording sheets of the media 12 subjected to recording in the recording job by updating the recording number counter in association with execution of the normal recording process. When this process is ended, the recording control section 19 causes the process to proceed to step S22.

As described above, the recording control section 19 can cause the liquid ejection head 28 to perform the recording operation in a state in which the cap 33 is located at the separation position in the initial recording process and the normal recording process. In other words, the liquid ejection head 28 can perform a recording operation in a state in which the cap 33 is located at the separation position in the recording job for performing recording on a predetermined number of the media 12.

In particular, the initial recording process is a process of transporting the medium 12 that has been waiting in advance at the standby position WP along the transport path 16 and executing a recording operation. The normal recording process is a process of feeding the medium 12 from the cassette 20 without previously transporting the medium 12 to the standby position WP, transporting the fed medium 12 along the transport path 16, and executing a recording operation. That is, the initial recording process is a process in which the time until the recording operation is executed can be reduced compared with the normal recording process.

In terms of modes, the recording control section 19 causes the first medium 12 to wait at the standby position WP in the first mode when the image processing is being performed after the start of the recording job. In the first mode, the recording control section 19 moves the cap 33 from the contact position to the separation position, and moves the support portion 26 from the retracted position to the support position when the image processing is being performed after the start of the recording job. Thus, the recording control section 19 can transport the first medium 12 waiting at the standby position WP without moving the cap 33 and the support portion 26 after the recording start condition is established.

On the other hand, in the second mode, the recording control section 19 does not transport the first medium 12 when the image processing is being performed after the start of the recording job. In the second mode, the recording control section 19 does not move the cap 33 from the contact position to the separation position, and does not move the support portion 26 from the retracted position to the support position when the image processing is being performed after the start of the recording job. In the second mode, after the image processing is ended and the recording start condition is established, the recording control section 19 moves the cap 33 from the contact position to the separation position, and moves the support portion 26 from the retracted position to the support position. In the second mode, the recording control section 19 causes the first medium 12 to be transported from the cassette 20 after the image processing is ended and the recording start condition is established.

In step S22, the recording control section 19 reads a value from the maintenance time counter, and determines whether or not a time measured after the cap 33 is displaced from the contact position to the separation position has exceeded a defined time. The defined time is shorter than a time for a recording operation of performing recording on a first number of sheets S1 of the media 12 and longer than a time for performing recording on the number of the media 12 obtained by subtracting "1" from the first number of sheets S1. Thus, when the recording operation is executed immediately after the cap 33 is displaced from the contact position to the separation position, the recording control section 19 determines that the defined time has elapsed even time the recording operation of performing recording on the first number of sheets S1 of the media 12 is executed. When the recording control section 19 determines that the measured time has exceeded the defined time, the process proceeds to step S27. When the recording control section 19 determines that the measured time does not exceed the defined time, the process proceeds to step S23.

In step S23, the recording control section 19 determines whether or not the first mode is set and the number of recording sheets in the recording job is an initial number. The initial number of sheets is the number of sheets that serves as a reference for performing a maintenance operation for the first time after the start of the recording job in the first mode. In the first mode, the initial number of sheets is set such that the number of recording sheets in the recording job becomes the initial number of sheets before the measured time exceeds the defined time after the start of the recording job. The initial number of sheets is assigned to the memory of the recording control section 19. The initial number of sheets is plural, for example, four.

The recording control section 19 reads a value from the recording number counter and specifies the number of recording sheets of the media 12 subjected to recording in the recording job. The recording control section 19 determines whether or not the number of recording sheets is the initial number of sheets. The recording control section 19 determines whether or not the first mode is set in the same manner as in step S12.

When the recording control section 19 determines that the first mode is set and the number of recording sheets in the recording job is the initial number of sheets, the process proceeds to step S27. When the recording control section 19 determines that the first mode is not set or that the number of recording sheets in the recording job is not the initial number of sheets, the process proceeds to step S24.

In step S24, the recording control section 19 determines whether or not the recording operation in the recording job has been ended. When the recording control section 19 determines that the recording operation in the recording job has not been ended, the process proceeds to step S21 again. Consequently, the recording control section 19 repeatedly executes the normal recording process until the recording operation in the recording job is ended. When the recording control section 19 determines that the recording operation in the recording job has been ended, the process proceeds to step S25.

In step S25, the recording control section 19 executes a capping process. In this process, the recording control section 19 controls the drive motor 26A to move the support portion 26 from the support position to the retracted position. The recording control section 19 controls the moving portion 36 to move the cap 33 from the separation position to the contact position. Consequently, the cap 33 changes from a state of being separated from the liquid ejection head 28 to a state of contacting the liquid ejection head 28. When this process is ended, the recording control section 19 causes the process to proceed to step S26.

In step S26, the recording control section 19 executes a maintenance process. In this process, the recording control section 19 controls the recording section 27 such that at least the liquid ejection head 28 ejects the liquid. Consequently, the recording control section 19 executes a maintenance operation on the liquid ejection head 28. In particular, the recording control section 19 controls the recording section 27 to execute a second maintenance operation in which a liquid ejection amount is a second ejection amount. When this process is ended, the recording control section 19 ends the recording control process.

In step S27, the recording control section 19 executes a capping process in the same manner as in step S25. When this process is ended, the recording control section 19 causes the process to proceed to step S28.

In step S28, the recording control section 19 executes a maintenance process. In this process, the recording control section 19 controls the recording section 27 such that the liquid ejection head 28 ejects the liquid. Consequently, the recording control section 19 executes a maintenance operation on the liquid ejection head 28.

In particular, in this process, when it is determined that the time measured in step S22 has exceeded the defined time, the recording control section 19 controls the recording section 27 to execute the second maintenance operation in which a liquid ejection amount is the second ejection amount. When the recording control section 19 determines in step S23 that the first mode is set and the number of recording sheets in the recording job is the initial number of sheets, the recording control section 19 controls the recording section 27 to execute a first maintenance operation in which a liquid ejection amount is a first ejection amount. The first ejection amount is smaller than the second ejection amount. That is, the first maintenance operation is a maintenance operation in which a liquid ejection amount is smaller than that in the second maintenance operation. The first maintenance operation is a maintenance operation in which a processing time is shorter than that in the second maintenance operation. The first maintenance operation may be an operation of performing weak flushing, and the second maintenance operation may be an operation of performing strong flushing.

As described above, when the measured time exceeds the defined time, the recording control section 19 causes the liquid ejection head 28 to execute the maintenance operation by ejecting the liquid while the cap 33 is located at the contact position. That is, when the measured time exceeds the defined time, the liquid ejection head 28 can execute the maintenance operation by ejecting the liquid while the cap 33 is located at the contact position.

In the first mode, the recording control section 19 causes the liquid ejection head 28 to execute a first maintenance operation after the recording job is started after the recording operation is executed on the initial number of the media 12 even before the measured time exceeds the defined time. That is, in the first mode, the liquid ejection head 28 executes the recording operation on the predetermined initial number of the media 12 after the start of the recording job, even before the measured time exceeds the defined time, and then executes the first maintenance operation after the start of the recording job.

Consequently, in the first mode, the recording control section 19 executes the recording operation on the initial number of the media 12, and then executes the first maintenance operation. Thereafter, in the first mode, the recording control section 19 executes the recording operation on the first number of sheets S1 of the media 12, and executes the second and subsequent maintenance operations each time the measured time exceeds the defined time. In the second mode, the recording control section 19 executes the recording operation on the first number of sheets S1 of the media 12, and executes the maintenance operation each time the measured time exceeds the defined time.

As a specific example, in a case where the initial number of sheets is four and the first number of sheets S1 is ten, in the first mode, the recording control section 19 executes a maintenance operation when a recording operation on fourth, fourteenth, and twenty-fourth media 12 in the recording job is ended. In the second mode, the recording control section 19 executes a maintenance operation when a recording operation on tenth, twentieth, and thirtieth media 12 in the recording job is ended.

In the first mode, the recording control section 19 causes the liquid ejection head 28 to eject the first ejection amount of liquid in the first maintenance operation in the recording job. That is, in the first mode, the liquid ejection head 28 ejects the first ejection amount of liquid in the first maintenance operation in the recording job.

In the first mode, the recording control section 19 causes the liquid ejection head 28 to eject the second ejection amount of liquid in the second and subsequent maintenance operations in the recording job. That is, in the first mode, the liquid ejection head 28 ejects the second ejection amount of liquid that is larger than the first ejection amount, in the second and subsequent maintenance operations in the recording job.

In the second mode, the recording control section 19 causes the liquid ejection head 28 to eject the second ejection amount of liquid in the maintenance operation. That is, in the second mode, the liquid ejection head 28 ejects the second ejection amount of liquid that is larger than the first ejection amount, in the maintenance operation in the recording job. When this process is ended, the recording control section 19 causes the process to proceed to step S29.

On the other hand, in step S29, the recording control section 19 executes a cap separation process in the same manner as in step S13. When this process is ended, the recording control section 19 causes the process to proceed to step S30.

In step S30, the recording control section 19 executes a measurement start process in the same manner as in step S14. When this process is ended, the recording control section 19 causes the process to proceed to step S24.

As described above, the recording control section 19 can perform control in either one of the first mode and the second mode. The recording control section 19 can execute the recording operation and the maintenance operation corresponding to a mode to be controlled.

Alignment Control Process

Next, an alignment control process will be described with reference to FIG. 5. The alignment control process is a process executed by the post-processing control section 80 of the post-processing device 14 when post-processing information that can specify the first mode or post-processing information that can specify the second mode is input.

In step S31, the post-processing control section 80 acquires post-processing information. The post-processing information includes the type of mode based on communication with the recording device 13. The post-processing information includes total processing number information based on communication with the recording device 13. The total processing number information is information indicating a total number of sheets of the media 12 to be subjected to post-processing in the recording job. When this process is ended, the post-processing control section 80 causes the process to proceed to step S32.

In step S32, the post-processing control section 80 determines whether or not the first mode is set based on the post-processing information. When the post-processing control section 80 determines that the first mode is set, the process proceeds to step S33. When the post-processing control section 80 determines that the first mode is not set, the process proceeds to step S37. In other words, when the post-processing control section 80 determines that the second mode is set, the process proceeds to step S37.

In step S33, the post-processing control section 80 determines whether or not a first initial control period is set. In this process, the post-processing control section 80 counts a total number of transported sheets of the media 12 by updating a total transport number counter based on a signal from the sensor 53. The total number of transported sheets is a total number of sheets of the media 12 after recording subjected to recording in one recording job, transported to the post-processing device 14. The total transport number counter is assigned to a memory of the post-processing control section 80.

The post-processing control section 80 determines that the first initial control period is set when the total number of transported sheets in the first mode is one or less. The post-processing control section 80 determines that a second initial control period is set when the total number of transported sheets in the first mode is two or more and four or less. The post-processing control section 80 determines that a normal control period is set when the total number of transported sheets in the first mode is five or more. The post-processing control section 80 determines that the normal control period is set regardless of a total number of transported sheets in the second mode.

The first initial control period, the second initial control period, and the normal control period are control periods associated with the recording job, and more specifically, are control periods related to post-processing that is executed in association with the recording job. The first initial control period and the second initial control period are control periods in the first mode. The second initial control period is a control period after the end of the first initial control period. Hereinafter, the first initial control period and the second initial control period may be collectively referred to as an initial control period. That is, the initial control period includes the first initial control period and the second initial control period.

The normal control period is a control period in the first mode and also a control period in the second mode. In the first mode, the normal control period is a control period after the end of the second initial control period. In other words, in the first mode, the normal control period is a control period after the initial control period is ended.

When the post-processing control section 80 determines that the first initial control period is set, the process proceeds to step S34. When the post-processing control section 80 determines that the first initial control period is not set, the process proceeds to step S35.

In step S35, the post-processing control section 80 determines whether or not the second initial control period is set. When the post-processing control section 80 determines that the second initial control period is set, the process proceeds to step S36. When the post-processing control section 80 determines that the second initial control period is not set, the process proceeds to step S37. In other words, when the post-processing control section 80 determines that the normal control period is set, the process proceeds to step S37.

In step S34, the post-processing control section 80 executes a processing number setting process for setting one sheet as a processing number. When this process is ended, the post-processing control section 80 causes the process to proceed to step S38.

In step S36, the post-processing control section 80 executes a processing number setting process. In this process, the post-processing control section 80 subtracts the total number of transported sheets from total processing number information to calculate a remaining number of sheets to be processed. When it is determined that the remaining number of sheets to be processed is equal to or larger than a second number of sheets S2, the post-processing control section 80 sets the second number of sheets S2 as the number of sheets to be processed. The second number of sheets S2 is plural, and may be three, for example. When it is determined that the remaining number of sheets to be processed is smaller than the second number of sheets S2, the post-processing control section 80 sets the remaining number of sheets to be processed as the number of sheets to be processed. When this process is ended, the post-processing control section 80 causes the process to proceed to step S38.

In step S37, the post-processing control section 80 executes a processing number setting process. In this process, the post-processing control section 80 subtracts the total number of transported sheets from total processing number information to calculate a remaining number of sheets to be processed. When it is determined that the remaining number of sheets to be processed is equal to or larger than the first number of sheets S1, the post-processing control section 80 sets the first number of sheets S1 as the number of sheets to be processed. The first number of sheets S1 is plural, and may be ten, for example. Thus, the second number of sheets S2 is smaller than the first number of sheets S1. When it is determined that the remaining number of sheets to be processed is smaller than the first number of sheets S1, the post-processing control section 80 sets the remaining number of sheets to be processed as the number of sheets to be processed. When this process is ended, the post-processing control section 80 causes the process to proceed to step S38.

As illustrated in FIG. 6, the post-processing control section 80 sets the number of sheets to be processed to one during the first initial control period in the first mode. The post-processing control section 80 sets the second number of sheets S2 as the number of sheets to be processed during the second initial control period in the first mode. The post-processing control section 80 sets the first number of sheets S1 as the number of sheets to be processed during the normal control period in the first mode and the second mode.

Figure 5:
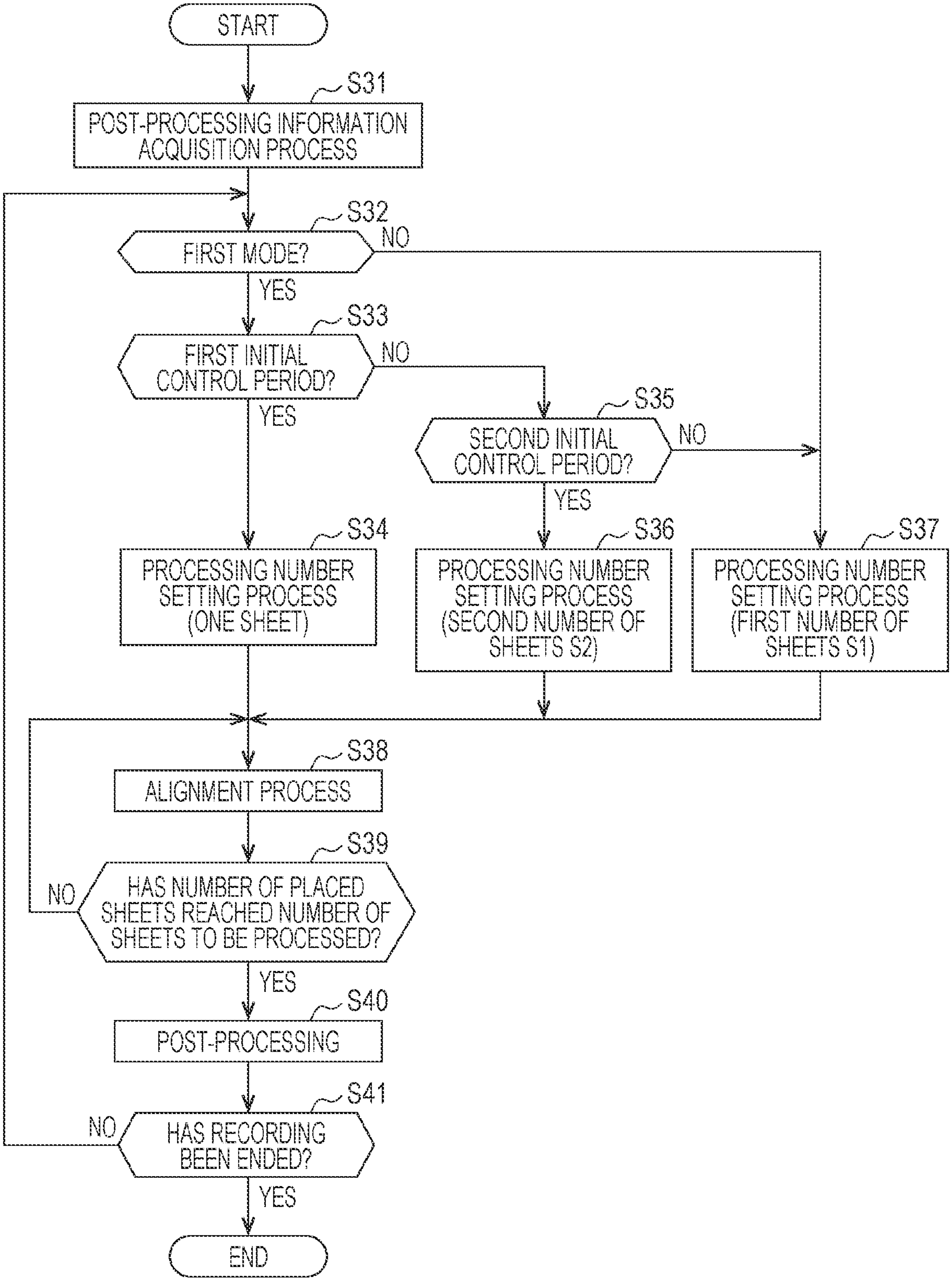
FIG. 5 is a flowchart illustrating an alignment control process.

Returning to the description of the alignment control process in FIG. 5, in step S38, the post-processing control section 80 executes the alignment process. In this process, the post-processing control section 80 rotates the first paddle 61 and the second paddle 62 by driving the transport motor 63. Consequently, the post-processing control section 80 transports the medium 12 placed on the processing tray 54 toward the first alignment portion 58. When this process is ended, the post-processing control section 80 causes the process to proceed to step S39.

In step S39, the post-processing control section 80 determines whether or not the number of the media 12 placed on the processing tray 54 has reached the number of sheets to be processed. The post-processing control section 80 counts the number of the media 12 placed on the processing tray 54 by updating a placement number counter based on a signal from the sensor 53. The placement number counter is assigned to the memory of the post-processing control section 80.

When the post-processing control section 80 determines that the number of placed sheets has not reached the number of sheets to be processed, the process proceeds to step S38 again. When the post-processing control section 80 determines that the number of placed sheets has reached the number of sheets to be processed, the process proceeds to step S40. As described above, the post-processing control section 80 repeatedly executes the alignment process until the number of placed sheets reaches the number of sheets to be processed, and when the number of placed sheets reaches the number of sheets to be processed, the process proceeds to step S40.

In step S40, the post-processing control section 80 causes the post-processing section 60 to perform post-processing on the medium 12 placed on the processing tray 54. The post-processing control section 80 controls the discharge portion 67 such that the medium 12 placed on the processing tray 54 is delivered from the processing tray 54 to the support member 71. Consequently, the post-processing control section 80 may place a plurality of post-processed media 12 on the discharge tray 72. The post-processing control section 80 initializes the placement number counter.

Specifically, in the first mode, the post-processing control section 80 causes the post-processing section 60 to execute a post-processing operation such that the first medium 12 that is not formed as a medium bundle on the processing tray 54 is discharged from the processing tray 54 during the first initial control period. As described above, in the first mode, the post-processing section 60 executes the post-processing operation such that the first medium 12 that is not formed as a medium bundle on the processing tray 54 is discharged from the processing tray 54 during the first initial control period.

In the first mode, the post-processing control section 80 causes the post-processing section 60 to execute a post-processing operation such that the second number of sheet S2 of the media 12 formed as a medium bundle on the processing tray 54 are discharged from the processing tray 54 during the second initial control period. Thus, in the first mode, the post-processing section 60 executes the post-processing operation such that the second number of sheets S2 of the media 12 formed as a medium bundle on the processing tray 54 are discharged from the processing tray 54 during the second initial control period. In other words, the post-processing section 60 can execute the post-processing operation on the second number of sheets S2 of the media 12 during the initial control period.

In the first mode, the post-processing control section 80 causes the post-processing section 60 to execute a post-processing operation such that the first number of sheets S1 of the media 12 formed as a medium bundle on the processing tray 54 are discharged from the processing tray 54 during the normal control period. As described above, in the first mode, the post-processing section 60 executes the post-processing operation such that the first number of sheets S1 of the media 12 formed as a medium bundle on the processing tray 54 are discharged from the processing tray 54 during the normal control period.

In the second mode, the post-processing control section 80 causes the post-processing section 60 to execute a post-processing operation such that the first number of sheets S1 of the media 12 formed as a medium bundle on the processing tray 54 are discharged from the processing tray 54 during the normal control period associated with the recording job. As described above, in the second mode, the post-processing section 60 executes the post-processing operation such that the first number of sheets S1 of the media 12 formed as a medium bundle on the processing tray 54 are discharged from the processing tray 54 during the control period associated with the recording job. In other words, the post-processing section 60 can execute the post-processing operation on the first number of sheets S1 of the media 12 during the normal control period.

The second number of sheets S2 is a number that is one less than the initial number. The initial number of sheets is the number of sheets that triggers the first maintenance using the liquid ejection head 28 in the first mode. The second number of sheets S2 is the number of sheets that triggers discharge from the processing tray 54 during the second initial control period in the first mode. One sheet is the number of sheets that triggers discharge from the processing tray 54 during the first initial control period in the first mode.

That is, in the first mode, the trigger for discharging the second number of sheets S2 of the media 12 from the processing tray 54 during the second initial control period is based on the trigger for the first maintenance executed by the liquid ejection head 28.

The first number of sheets S1 is the number of sheets that triggers discharge from the processing tray 54 during the normal control period in the first mode. The first number of sheets S1 is the number of sheets that triggers discharge from the processing tray 54 during the normal control period in the second mode. The first number of sheets S1 is the number that triggers determination that the time measured with reference to displacement of the cap 33 from the contact position to the separation position has exceeded a defined time.

That is, in the first mode, the trigger for discharging the first number of sheets S1 of the media 12 from the processing tray 54 during the normal control period is based on the trigger for the second and subsequent maintenance executed by the liquid ejection head 28. In the second mode, the trigger for discharging the first number of sheets S1 of the media 12 from the processing tray 54 during the normal control period is based on the trigger for maintenance performed by the liquid ejection head 28.

As a specific example, in the first mode, the recording device 13 executes the first maintenance operation after recording is performed on the fourth medium 12. In the first mode, after the first medium 12 is discharged, the second to fourth media 12 are discharged from the processing tray 54 as a medium bundle in the post-processing device 14. As described above, in the first mode, the post-processing section 60 executes the post-processing operation during the second initial control period by using the time for the maintenance operation of the liquid ejection head 28. In the first mode, it can also be said that the post-processing section 60 executes the post-processing operation by using a time between the recording operation on the first medium 12 and the recording operation on the second medium 12 during the first initial control period regardless of the time for the maintenance operation of the liquid ejection head 28.

In the first mode, the recording device 13 executes the second maintenance operation after performing recording on the fourteenth medium 12. In the first mode, in the post-processing device 14, the fifth to fourteenth media 12 are discharged from the processing tray 54 as a medium bundle. As described above, in the first mode, the post-processing section 60 executes the post-processing operation by using the time for the maintenance operation of the liquid ejection head 28 even during the normal control period.

In the second mode, the recording device 13 performs the first maintenance operation after performing recording on the tenth medium 12. In the second mode, in the post-processing device 14, the first to tenth media 12 are discharged from the processing tray 54 as a medium bundle. In the second mode, the recording device 13 executes the second maintenance operation after performing recording on the twentieth medium 12. In the second mode, the eleventh to twentieth media 12 are discharged from the processing tray 54 as a medium bundle in the post-processing device 14. As described above, the post-processing section 60 executes the post-processing operation during the normal control period even in the second mode by using the time for the maintenance operation of the liquid ejection head 28. When this process is ended, the post-processing control section 80 causes the process to proceed to step S41.

In step S41, the post-processing control section 80 determines whether or not recording has been ended. The post-processing control section 80 determines that the recording has been ended when the total number of transported sheets reaches the total number of sheets to be processed and all the media 12 are sent out to the support member 71. When the post-processing control section 80 determines that the recording has not been ended, the process proceeds to step S32. When it is determined that the recording has been ended, the post-processing control section 80 ends the alignment control process.

Operation of First Embodiment

An operation of the first embodiment will be described.

Figure 7:
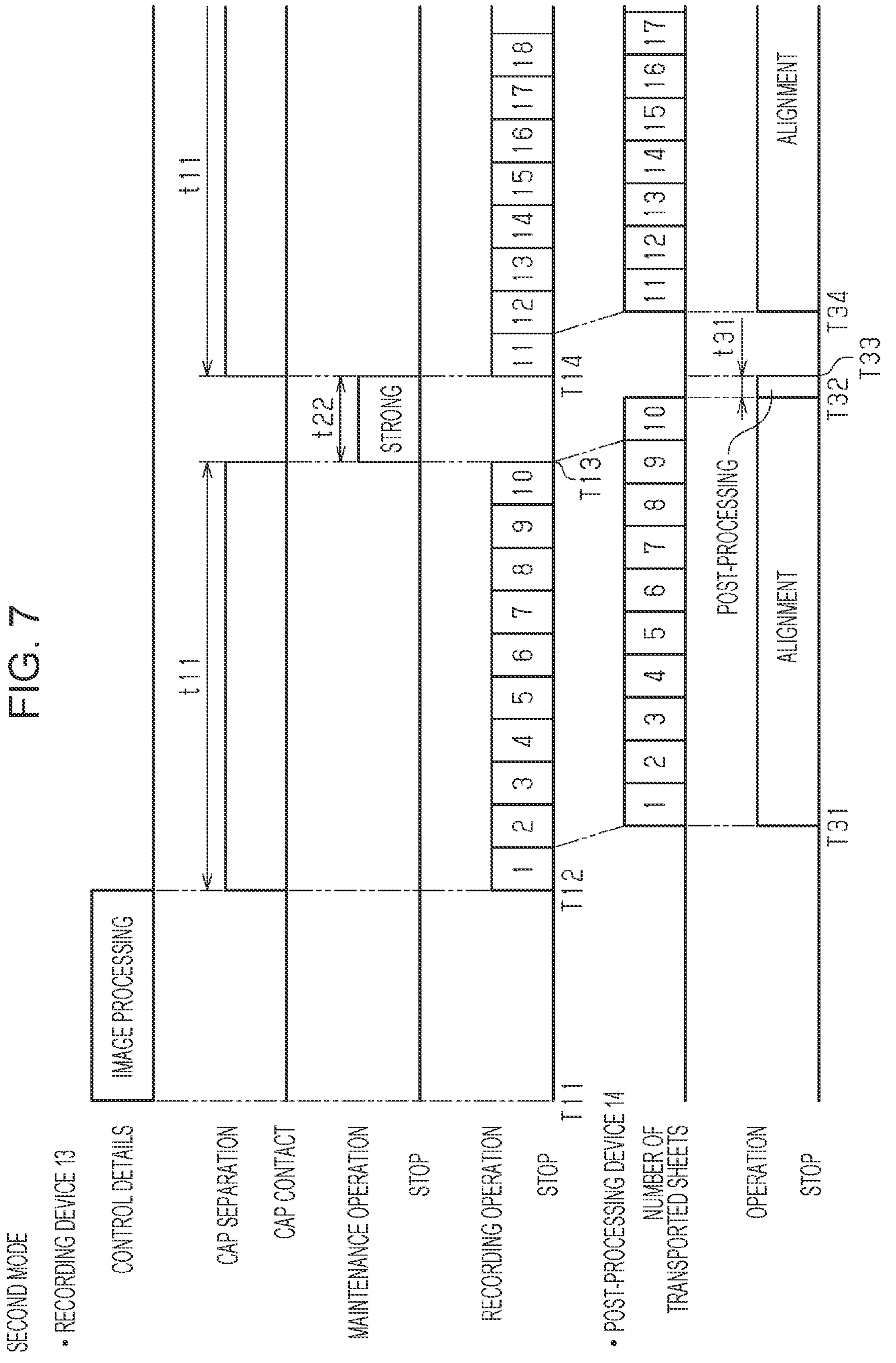
FIG. 7 is a timing chart illustrating control details in the recording system.
Figure 8:
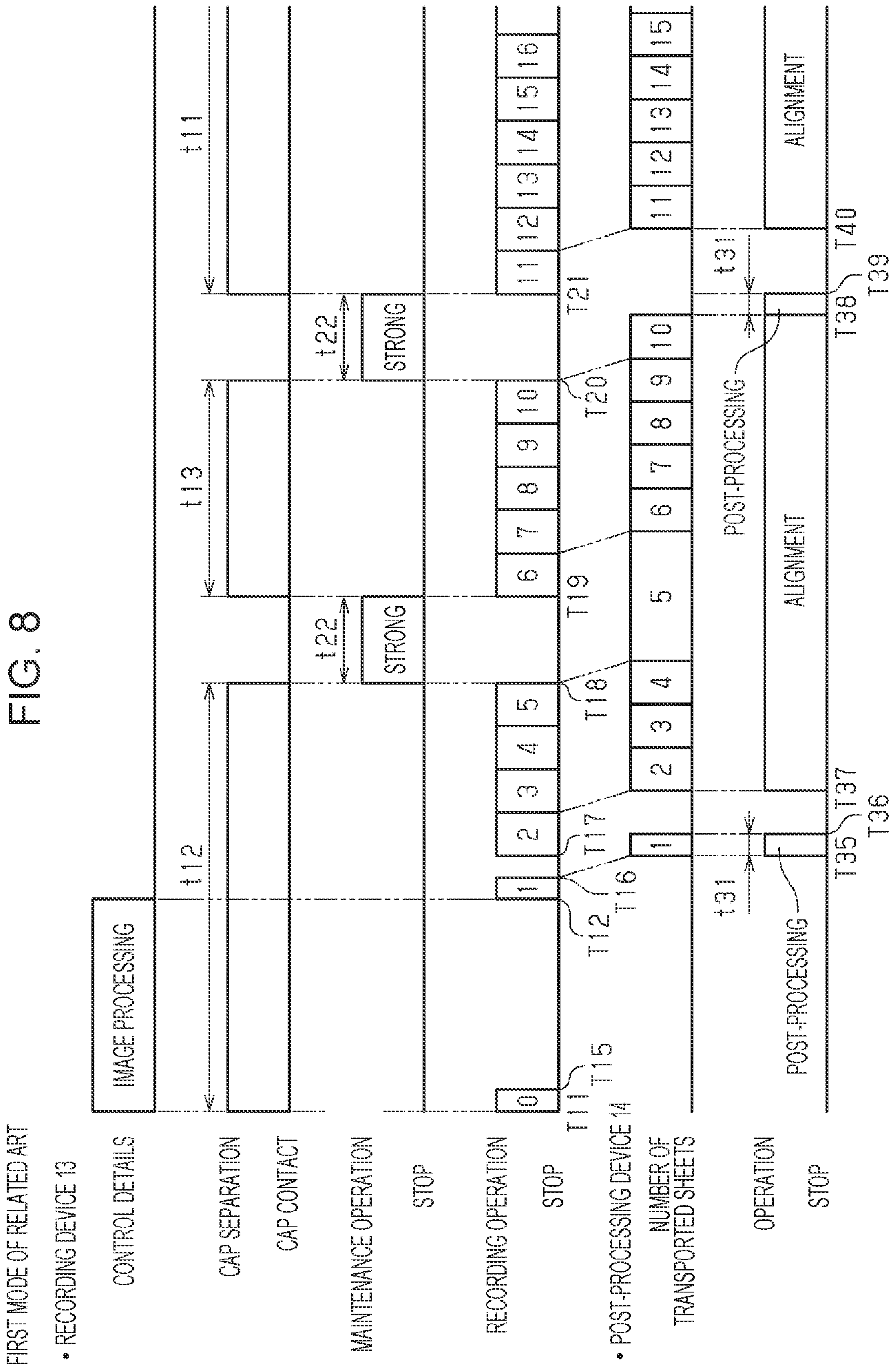
FIG. 8 is a timing chart illustrating control details in the recording system.
Figure 9:
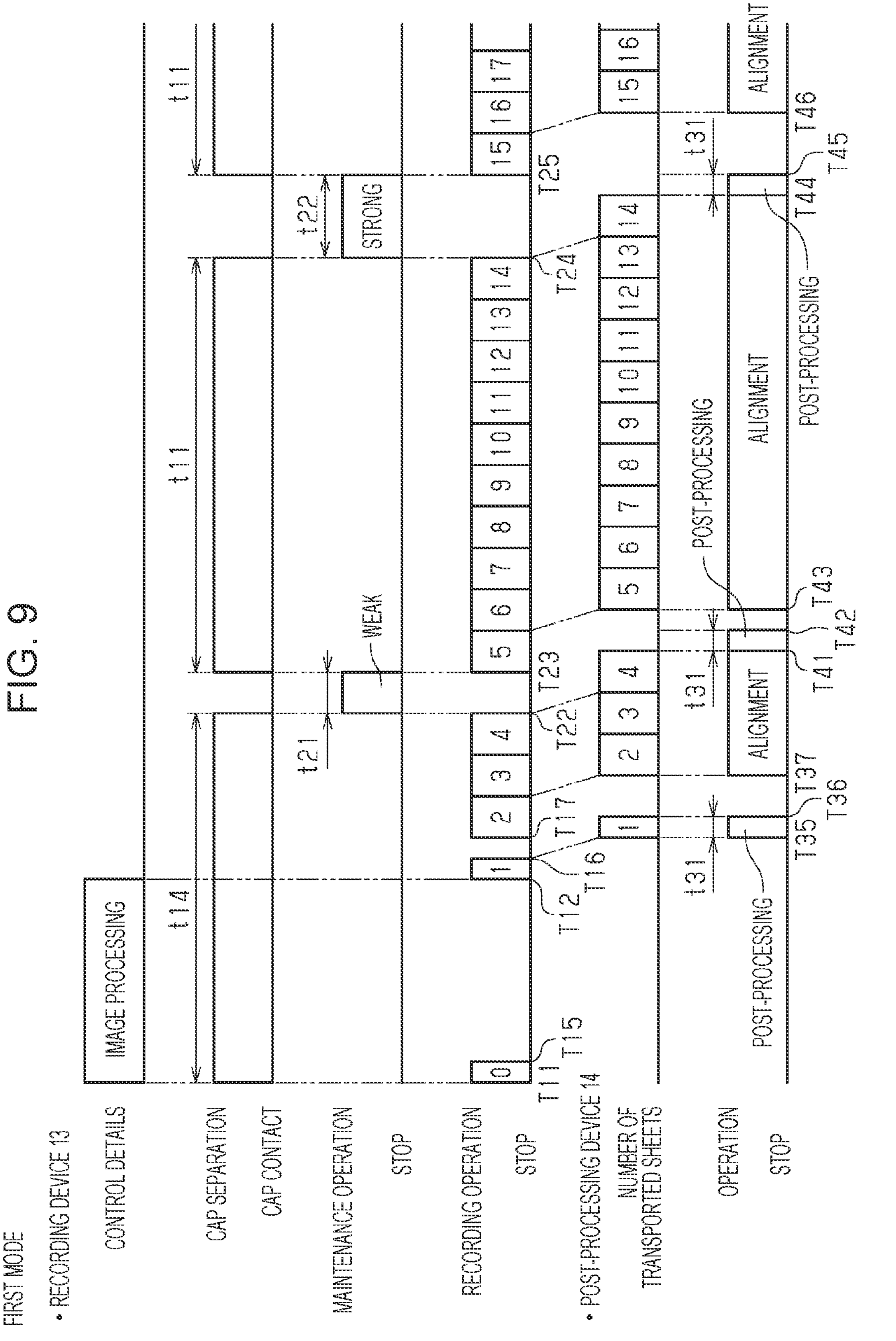
FIG. 9 is a timing chart illustrating control details in the recording system.

First, with reference to FIG. 7, a specific example of a recording job controlled in the second mode will be described. In FIGS. 7 to 9, for better understanding of the present disclosure, as a timing chart illustrating a recording operation, a recording operation including feeding and transporting of the medium 12 in the recording device 13 is illustrated.

As illustrated in FIG. 7, in the recording device 13, when recording job information that can specify the second mode is input at a timing indicated by the reference sign T11 in a state in which the cap 33 is located at the contact position, a recording job is started. When the recording job is started, image processing based on the recording job information is started. Post-processing information is transmitted from the recording device 13 to the post-processing device 14.

When the image processing is ended and a recording start condition is established at a timing indicated by the reference sign T12, the cap 33 is displaced from the contact position to the separation position. Although not illustrated, the support portion 26 is displaced from the retracted position to the support position. For the sake of convenience, FIG. 7 illustrates that the image processing is executed until the recording start condition is established.

Thereafter, a recording operation on the first medium 12 is started. As a result of executing the recording operation on the second to tenth media 12, the recording operation on the tenth medium 12 is ended at a timing indicated by the reference sign T13.

In this case, time t11 has passed after displacement of the cap 33 from the contact position to the separation position at the timing indicated by the reference sign T12. Time t11 is longer than a defined time. Therefore, the time measured after the cap 33 is displaced from the contact position to the separation position exceeds the defined time. Consequently, execution of a recording operation on the eleventh medium 12 is postponed.

When the recording operation on the eleventh medium 12 is postponed at a timing indicated by the reference sign T13, the support portion 26 is displaced from the support position to the retracted position although not illustrated. The cap 33 is displaced from the separation position to the contact position.

Thereafter, the first maintenance operation in the recording job is started. Strong flushing is executed as the first maintenance operation. In the strong flushing, the second ejection amount of liquid is ejected over time t22.

When the first maintenance operation is ended at a timing indicated by the reference sign T14, the cap 33 is displaced from the contact position to the separation position. Although not illustrated, the support portion 26 is displaced from the retracted position to the support position. Thereafter, the recording operation on the eleventh and subsequent media 12 is started.

On the other hand, in the post-processing device 14, the first medium 12 is detected at a timing indicated by the reference sign T31. The timing at which the first medium 12 is detected is delayed by the time that the first medium 12 is transported along the transport path 16 after the recording operation on the first medium 12 is ended. The first medium 12 is placed on the processing tray 54. The first medium 12 placed on the processing tray 54 is transported toward the first alignment portion 58 due to rotation of the first paddle 61 and the second paddle 62, and, as a result, the first medium 12 is aligned with the first alignment portion 58 on the processing tray 54. Thereafter, the second to tenth media 12 are also aligned with the first alignment portion 58 on the processing tray 54 in the same manner as the first medium 12. Consequently, ten media 12 are formed as a medium bundle on the processing tray 54.

At a timing indicated by the reference sign T32, the post-processing operation is executed on the ten media 12 formed as a medium bundle on the processing tray 54. In this case, ten sheets of the media 12 are discharged from the processing tray 54 as a result of stacking process as a post-processing. As described above, the post-processing operation on the ten media 12 is started at the timing indicated by the reference sign T32. As a result of executing the post-processing operation over time t31, the post-processing operation on the ten media 12 is ended at a timing indicated by the reference sign T33. This post-processing operation is executed by using the time for the maintenance operation of the recording device 13. Thus, the post-processing operation on the ten media 12 is ended before the eleventh media 12 is detected.

The eleventh medium 12 is detected at a timing indicated by the reference sign T34. The eleventh medium 12 is aligned with the first alignment portion 58 on the processing tray 54 in the same manner as the first to tenth media 12. Thereafter, the twelfth and subsequent media 12 are also aligned with the first alignment portion 58 on the processing tray 54 in the same manner as the eleventh media 12.

Next, with reference to FIG. 8, a specific example of a recording job that is controlled in the first mode in a case where the control details examined in the related art are applied will be described. The description of the same details as those of a specific example of the recording job controlled in the second mode will be omitted.

As the control details examined in the related art, in the recording device 13, a maintenance operation is executed both when a time counted after the cap 33 is displaced from the contact position to the separation position exceeds a defined time and when a recording operation is executed on the first number of sheets S1 of the media 12. As the control details examined in the related art, in the post-processing device 14, a post-processing operation is executed when a recording operation on the first number of sheets S1 of the media 12 is ended except for the first medium 12.

As illustrated in FIG. 8, in the recording device 13, when recording job information that can specify the first mode is input at the timing indicated by the reference sign T11 in a state in which the cap 33 is located at the contact position, a recording job is started.

When a recording job is started, an initial transport process is executed. In FIG. 8, the initial transport process is illustrated as “0”. In this initial transport process, the first medium 12 is transported to the standby position WP after being fed from the cassette 20. The cap 33 is displaced from the contact position to the separation position. Although not illustrated, the support portion 26 is displaced from the retracted position to the support position. As described above, before the recording operation is started, the first medium 12 waits at the standby position WP at a timing indicated by the reference sign T15.

When the image processing is ended and a recording start condition is established at a timing indicated by the reference sign T12, the recording operation on the first medium 12 is started. The recording operation on the first medium 12 is ended at a timing indicated by the reference sign T16. In this case, in the first mode, the first medium 12 waits at the standby position WP and the cap 33 is located at the separation position, and thus the recording operation is ended in a shorter time than in the second mode.

The recording operation on the second medium 12 is started at the timing indicated by the reference sign T17. As a result of executing the recording operation on the third to fifth media 12, the recording operation on the fifth medium 12 is ended at a timing indicated by the reference sign T18.

In this case, time t12 has passed after displacement of the cap 33 from the contact position to the separation position at the timing indicated by the reference sign T11. Time t12 is longer than the defined time. Therefore, the time measured after the cap 33 is displaced from the contact position to the separation position exceeds the defined time. Consequently, the recording operation on the sixth medium 12 is postponed.

When the recording operation on the sixth medium 12 is postponed at the timing indicated by the reference sign T18, the support portion 26 is displaced from the support position to the retracted position although not illustrated. The cap 33 is displaced from the separation position to the contact position.

Thereafter, the first maintenance operation in the recording job is started. Strong flushing is executed as the first maintenance operation.

When the first maintenance operation is ended at a timing indicated by the reference sign T19, the cap 33 is displaced from the contact position to the separation position. Although not illustrated, the support portion 26 is displaced from the retracted position to the support position. Thereafter, the recording operation on the sixth medium 12 is started. As a result of executing the recording operation on the seventh to tenth media 12, the recording operation on the tenth medium 12 is ended at a timing indicated by the reference sign T20. In this case, time t13 has passed from displacement of the cap 33 from the contact position to the separation position at a timing indicated by the reference sign T19. Time t13 is a time shorter than the defined time. However, the execution of the recording operation on the first number of sheets S1 of the media 12 causes the second maintenance operation to be executed as will be described later, and thus the recording operation on the eleventh medium 12 is postponed.

When the recording operation on the eleventh medium 12 is postponed at the timing indicated by the reference sign T20, the support portion 26 is displaced from the support position to the retracted position although not illustrated. The cap 33 is displaced from the separation position to the contact position.

Thereafter, the second maintenance operation in the recording job is started. Strong flushing is performed as the second maintenance operation.

When the second maintenance operation is ended at a timing indicated by the reference sign T21, the cap 33 is displaced from the contact position to the separation position. Although not illustrated, the support portion 26 is displaced from the retracted position to the support position. Thereafter, the recording operation on the eleventh and subsequent media 12 is started.

In this case, in the recording device 13, the maintenance operation is performed both after the recording operation on the fifth medium 12 is ended and after the recording operation on the tenth medium 12 is ended. When the first maintenance operation is not executed after the recording operation on the fifth medium 12 is ended, a state of the liquid ejection head 28 may deteriorate. Thus, the first maintenance operation is executed after the recording operation on the fifth medium 12 is ended.

However, after the recording operation on the tenth medium 12 is ended, the second maintenance operation is executed, but a time measured after the first maintenance operation is ended and the cap 33 is displaced from the contact position to the separation position does not exceed the defined time. Thus, the second maintenance operation is executed after the recording operation on the tenth medium 12 is ended, and thus the recording operation is not continued. Therefore, there is room for improvement in order to increase a processing speed.

On the other hand, in the post-processing device 14, the first medium 12 is detected at a timing indicated by the reference sign T35. The first medium 12 is placed on the processing tray 54. The first medium 12 placed on the processing tray 54 is transported toward the first alignment portion 58 due to rotation of the first paddle 61 and the second paddle 62, and, as a result, the first medium 12 is aligned with the first alignment portion 58 on the processing tray 54.

The post-processing operation is executed on one medium 12 that is not formed as a medium bundle on the processing tray 54. In this case, one medium 12 is discharged from the processing tray 54 as a result of performing a stacking process as the post-processing. As described above, the post-processing operation on one medium 12 is started at a timing indicated by the reference sign T35. As a result of executing the post-processing operation over time t31, the post-processing operation on one medium 12 is ended at a timing indicated by the reference sign T36. This post-processing operation is executed by using a time between the recording operation on the first medium 12 and the recording operation on the second medium 12 in the recording device 13. Thus, the post-processing operation on one medium 12 is ended before the second medium 12 is detected.

The second medium 12 is detected at a timing indicated by the reference sign T37. The second medium 12 is aligned with the first alignment portion 58 on the processing tray 54 in the same manner as the first medium 12. Thereafter, the third to tenth media 12 are also aligned with the first alignment portion 58 on the processing tray 54 in the same manner as the first medium 12. Consequently, the nine media 12 are formed as a medium bundle on the processing tray 54.

At a timing indicated by the reference sign T38, the post-processing operation is executed on the nine media 12 formed as a medium bundle on the processing tray 54. In this case, the nine media 12 are discharged from the processing tray 54 as a result of performing a stacking process as the post-processing. As described above, the post-processing operation on the nine media 12 is started at the timing indicated by the reference sign T38. As a result of executing the post-processing operation over time t31, the post-processing operation on the nine media 12 is ended at a timing indicated by the reference sign T39. This post-processing operation is executed by using the time for the maintenance operation of the recording device 13. Thus, the post-processing operation on the nine media 12 is ended before the eleventh media 12 is detected. The eleventh medium 12 is detected at a timing indicated by the reference sign T40.

In this case, in the recording device 13, the maintenance operation may be executed before the recording operation on the sixth medium 12 is started, and thus a timing at which the sixth medium 12 is transported is delayed in the post-processing device 14. However, in the control examined in the related art, the post-processing operation is not executed on the second to fifth media 12, and the time for the maintenance operation cannot be used effectively.

Finally, a specific example of a recording job controlled in the first mode in the present embodiment will be described with reference to FIG. 9. The description of the same content as when the control examined in the related art is applied will be omitted.

As illustrated in FIG. 9, in the recording device 13, the recording operation on the fourth medium 12 is ended at a timing indicated by the reference sign T22. In this case, time t14 has passed after displacement of the cap 33 from the contact position to the separation position at a timing indicated by the reference sign T11. Although time t14 is shorter than the defined time, the recording operation on the initial number of the media 12 in the first mode is executed. Consequently, the recording operation on the fifth medium 12 is postponed.

When the recording operation on the fifth medium 12 is postponed at a timing indicated by the reference sign T22, the support portion 26 is displaced from the support position to the retracted position although not illustrated. The cap 33 is displaced from the separation position to the contact position.

Thereafter, the first maintenance operation in the recording job is started. As the first maintenance operation, weak flushing is executed. In the weak flushing, the first ejection amount of liquid is ejected over time t21.

As described above, the first maintenance operation is executed by executing the recording operation on four media 12, but a state of the liquid ejection head 28 is less deteriorated than in the execution of the recording operation on ten media 12. Thus, by executing weak flushing instead of strong flushing, it is possible to reduce a liquid ejection amount and reduce a processing time of the maintenance operation.

When the first maintenance operation is ended at a timing indicated by the reference sign T23, the cap 33 is displaced from the contact position to the separation position. Although not illustrated, the support portion 26 is displaced from the retracted position to the support position. Thereafter, the recording operation on the fifth and subsequent media 12 is started. As a result of executing the recording operation on the sixth to fourteenth media 12, the recording operation on the fourteenth media 12 is ended at a timing indicated by the reference sign T24.

In this case, time t11 has passed after displacement of the cap 33 from the contact position to the separation position at a timing indicated by the reference sign T23. Time t11 is longer than a defined time.

Therefore, the time measured after the cap 33 is displaced from the contact position to the separation position exceeds the defined time. Consequently, the recording operation on the fifteenth medium 12 is postponed.

When the recording operation on the fifteenth medium 12 is postponed at a timing indicated by the reference sign T24, the support portion 26 is displaced from the support position to the retracted position although not illustrated. The cap 33 is displaced from the separation position to the contact position.

Thereafter, the second maintenance operation in the recording job is started. Strong flushing is performed as the second maintenance operation.

When the second maintenance operation is ended at a timing indicated by the reference sign T25, the cap 33 is displaced from the contact position to the separation position. Although not illustrated, the support portion 26 is displaced from the retracted position to the support position. Thereafter, the recording operation on the fifteenth and subsequent media 12 is started.

On the other hand, in the post-processing device 14, the fourth medium 12 is detected at a timing indicated by the reference sign T41. The second to fourth media 12 are aligned with the first alignment portion 58 on the processing tray 54 in the same manner as the first medium 12. Consequently, the three media 12 are formed as a medium bundle on the processing tray 54.

The post-processing operation is executed on the three media 12 formed as a medium bundle on the processing tray 54 at a timing indicated by the reference sign T41. In this case, the three media 12 are discharged from the processing tray 54 as a result of performing a stacking process as the post-processing. Thus, the post-processing operation on the three media 12 is started at a timing indicated by the reference sign T41. As a result of executing the post-processing operation over time t31, the post-processing operation on the three media 12 is ended at a timing indicated by the reference sign T42. This post-processing operation is executed by using the time for the maintenance operation of the recording device 13. Thus, the post-processing operation on the three media 12 is ended before the fifth media 12 is detected.

The fifth medium 12 is detected at a timing indicated by the reference sign T43. The fifth medium 12 is also aligned with the first alignment portion 58 on the processing tray 54 in the same manner as the first medium 12. Thereafter, the sixth to fourteenth media 12 are also aligned with the first alignment portion 58 on the processing tray 54 in the same manner as the first medium 12. Consequently, ten media 12 are formed as a medium bundle on the processing tray 54.

At a timing indicated by the reference sign T44, the post-processing operation is performed on the ten media 12 formed as a medium bundle on the processing tray 54. In this case, ten sheets of the media 12 are discharged from the processing tray 54 as a result of stacking process as a post-processing. As described above, the post-processing operation on the ten media 12 is started at a timing indicated by the reference sign T44. As a result of executing the post-processing operation over time t31, the post-processing operation on the nine media 12 is ended at a timing indicated by the reference sign T45. This post-processing operation is executed by using the time for the maintenance operation of the recording device 13.

Therefore, the post-processing operation on ten media 12 is ended before the fifteenth media 12 is detected. The fifteenth medium 12 is detected at a timing indicated by the reference sign T46.

Effects of First Embodiment

Effects of the first embodiment will be described.

1. When a time measured with reference to displacement of the cap 33 from the contact position to the separation position exceeds a defined time, the maintenance operation can be executed by ejecting the liquid in a state in which the cap 33 is located at the contact position. The first medium 12 can be made to wait at the standby position WP upstream of the liquid ejection head 28 before the start of the recording operation in the recording job for performing recording on a predetermined number of the media 12. In that case, the cap 33 is located at the separation position when the first medium 12 in the recording job is waiting at the standby position WP. During the second initial control period of the control period associated with the recording job, it is possible to use the time for the maintenance operation to perform the post-processing operation on the media 12 of the second number of sheets S2 that is smaller than the first number of sheets S1. After the end of the second initial control period, the post-processing operation on the first number of sheets S1 of the media 12 can be performed using the time for the maintenance operation. Therefore, before starting the recording operation in the recording job, the first medium 12 can be made to wait at the standby position WP, and the cap 33 can be displaced from the contact position to the separation position. Consequently, the processing time from the start of the recording operation in the recording job can be reduced for the first medium 12.

Since the processing time from the start of the recording operation on the first medium 12 is reduced, the cap 33 is displaced to the separation position before the start of the recording operation, and a timing at which the cap 33 is displaced to the separation position is advanced with reference to the start of the recording operation. Consequently, the number of the media 12 to be subjected to recording in the recording operation is reduced before the measured time exceeds the defined time.

Therefore, during the second initial control period of the control period associated with the recording job, the post-processing operation can be executed on the media 12 of the second number of sheets S2 that is smaller than the first number of sheets S1 after the end of the initial control period by using the time for the maintenance operation. Consequently, even when the time for the maintenance operation is reduced, by executing the post-processing operation on the media 12 of the second number of sheets S2 that is smaller than the first number of sheets S1, the post-processing operation can be performed by using the time for the maintenance operation. When the measured time exceeds the defined time, the cap 33 is displaced from the retracted position to the contact position, and thus it is possible to suppress drying of the liquid ejection head 28. Therefore, the processing speed can be improved without deterioration in the recording quality due to the maintenance operation.

2. Control can be performed in either one of the first mode and the second mode. The first mode is a mode in which a timing of the recording operation and a timing of the post-processing operation on the first medium 12 are advanced with reference to the start of the recording job compared with the second mode. In the first mode, the first medium 12 that is not formed as a medium bundle on the processing tray 54 is discharged from the processing tray 54 during the first initial control period. In the first mode, during the second initial control period after the end of the first initial control period, the second number of sheets S2 of the media 12 formed as a medium bundle on the processing tray 54 are discharged from the processing tray 54 by using the time for the maintenance operation. After the end of the second initial control period, the first number of sheets S1 of the media 12 formed as a medium bundle on the processing tray 54 are discharged from the processing tray 54 by using the time for the maintenance operation of the liquid ejection head 28. Thus, the processing time until the first medium 12 is discharged can be reduced. Consequently, it is possible to provide a user with a situation in which the first medium 12 can be checked early. Therefore, the processing speed can be improved without deterioration in the recording quality due to the maintenance operation.

3. In the first mode, even before the measured time exceeds the defined time, the recording operation is performed on the predetermined initial number of the media 12 after the start of the recording job, and then the first maintenance operation is performed. Thus, even before the measured time exceeds the defined time after the start of the recording job, the recording operation on the initial number of the media 12 is executed, and thus it is possible to reliably perform the first maintenance operation. Therefore, the processing speed can be improved without deterioration in the recording quality due to the maintenance operation.

4. In the second mode, during the control period associated with the recording job, the first number of sheets S1 of the media 12 formed as a medium bundle on the processing tray 54 are discharged from the processing tray 54 by using the time for the maintenance operation of the liquid ejection head 28. Thus, in the second mode, the post-processing operation can be executed on the first number of sheets S1 of the media 12 during the control period associated with the recording job. As described above, when either one of the first mode and the second mode can be controlled, control of the post-processing operation can be switched depending on a situation. Therefore, depending on a situation, a processing speed can be improved without deterioration in the recording quality due to the maintenance operation.

5. In the first mode, the number of recording operations up to the first maintenance operation in the recording job is likely to be less than the number of recording operations during subsequent maintenance operations. As described above, in the recording job, it is highly possible that a state of the liquid ejection head 28 has not deteriorated by the first maintenance operation compared with during subsequent maintenance operations.

Therefore, in the first mode, a liquid in the first ejection amount is ejected in the first maintenance operation in the recording job. In the first mode, a liquid in the second ejection amount larger than the first ejection amount is ejected in the second and subsequent maintenance operations in the recording job. Thus, in the first mode, in the first maintenance operation in the recording job, a liquid ejection amount can be made smaller than in the second and subsequent maintenance operations. Therefore, it is possible to reduce consumption of a liquid due to the maintenance operation without deterioration in the recording quality due to the maintenance operation.

6. In the first mode, the liquid ejection head 28 can perform the first maintenance operation in the recording job over a first processing time. In the first mode, the second and subsequent maintenance operations in the recording job can be executed over a second processing time longer than the first processing time. Therefore, in the first mode, a processing time for the first maintenance operation in the recording job can be reduced compared with the second and subsequent maintenance operations. Therefore, the processing speed can be improved without deterioration in the recording quality due to the maintenance operation.

Second Embodiment

Next, a second embodiment will be described.

In the second embodiment, in a case where a time measured with reference to displacement of the cap 33 from the contact position to the separation position exceeds a defined time, execution of the maintenance operation may be restricted when a restriction condition is established. In the following description, the same the reference signs are given to the same configurations and the same control details as those of the already described embodiment, and redundant descriptions thereof will be omitted or simplified.

Figure 10:
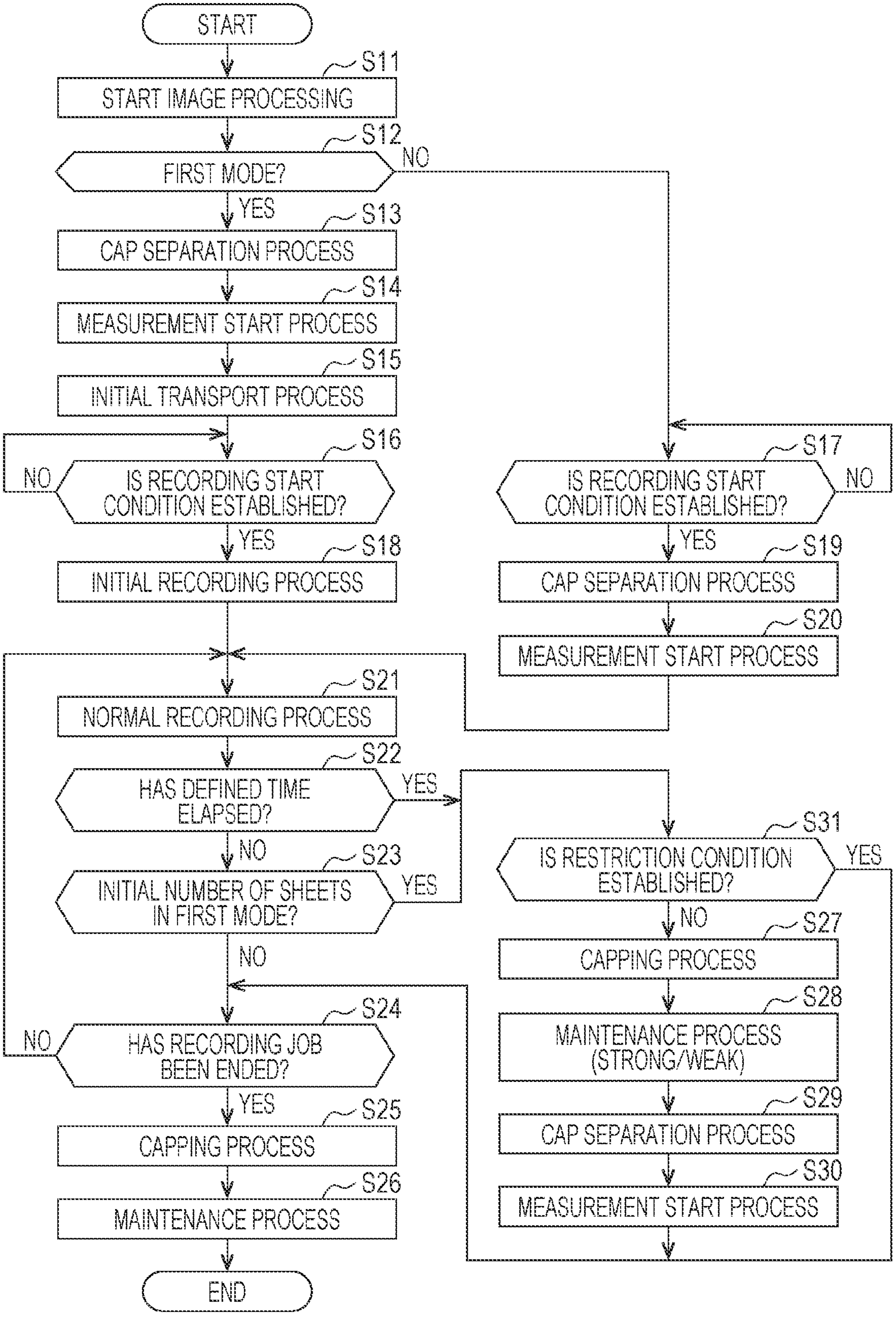
FIG. 10 is a flowchart illustrating a recording control process.

As illustrated in FIG. 10, in the recording control process, the recording control section 19 causes the process to proceed to step S31 when it is determined in step S22 that a defined time has been exceeded. When the recording control section 19 determines in step S23 that the first mode is set and that the number of recording sheets in the recording job is the initial number of sheets, the process proceeds to step S31.

In step S31, the recording control section 19 determines whether or not a restriction condition is established. The restriction condition is established when the time for the maintenance operation is longer than a time for executing the recording operation on a remaining number of media 12 in the recording job.

In this process, the recording control section 19 specifies total recording number information based on the recording job information. The recording control section 19 reads a value from the recording number counter and specifies the number of recording sheets of the media 12 subjected to recording in the recording job. The recording control section 19 subtracts the number of recording sheets of the media 12 from the total recording number information to specify a remaining number of media 12 in the recording job. The recording control section 19 determines that the restriction condition is established when the remaining number of media 12 is equal to or smaller than a lower limit number of sheets.

The lower limit number of sheets is the number of media 12 on which recording can be performed before the maintenance operation is ended, not including 0 sheets. As a specific example, the number of media 12 on which recording can be performed before strong flushing is ended may be two. As described above, the strong flushing is performed when it is determined in step S22 that the defined time has been exceeded. In this case, the lower limit number of sheets is two. The number of sheets that can be recorded on the medium 12 until the weak flushing is ended is one. Thus, when it is determined in step S23 that the first mode is set and the number of recording sheets in the recording job is the initial number of sheets, weak flushing is performed. In this case, the lower limit number of sheets is one. That is, the lower limit number of sheets may be varied depending on the time for the maintenance operation.

When the recording control section 19 determines that the restriction condition is not established, the process proceeds to step S26. That is, when the recording control section 19 determines that the restriction condition is not established, the maintenance process is executed in step S28.

When the recording control section 19 determines that the restriction condition is established, the process proceeds to step S25. That is, when the recording control section 19 determines that the restriction condition is established, the recording operation is performed on the remaining number of media 12 without performing the maintenance process in step S28. After the recording operation on the remaining number of media 12 is ended, the recording control section 19 determines that the recording operation in the recording job is ended in step S24, and executes the maintenance process in step S26. That is, in a case where the restriction condition is established when the defined time is exceeded in the recording job, the liquid ejection head 28 executes the maintenance operation after executing the recording operation on the remaining number of media 12 in the recording job.

In the post-processing device 14, in a case where the total number of sheets to be processed is five in the first mode, the post-processing control section 80 restricts execution of the post-processing operation even when the number of placed sheets becomes the number of sheets to be processed during the second initial control period. The post-processing control section 80 executes the post-processing operation when the total number of transported sheets reaches a total number of sheets to be post-processed.

In the first mode, in a case where the total number of sheets to be processed is not five and it is determined that a result of subtracting the total number of transported sheets from the total number of sheets to be post-processed is one or two when the number of placed sheets becomes the number of sheets to be processed, the post-processing control section 80 restricts execution of the post-processing operation. In the second mode, when the number of placed sheets becomes the number of sheets to be processed, and it is determined that a result of subtracting the total number of transported sheets from the total number of sheets to be post-processed is one or two, the post-processing control section 80 restricts execution of the post-processing operation. The post-processing control section 80 executes the post-processing operation when the total number of transported sheets reaches a total number of sheets to be post-processed.

Operation of Second Embodiment

An operation of the second embodiment will be described.

In the recording device 13, in the first mode, in a case where the total number of recording sheets is five, even when the recording operation on the fourth medium 12 is ended, the maintenance operation is not executed. After the recording operation on the fifth medium 12 is executed, the maintenance operation is executed.

In the post-processing device 14, in the first mode, the post-processing operation on the fourth medium 12 is not executed when the total number of sheets to be processed is five. The post-processing operation is executed on the second to fifth media 12 placed on the processing tray 54.

In the recording device 13, in a case where it is determined that the defined time has been exceeded, when the remaining number of sheets of the medium 12 in the recording job is one or two, the maintenance operation is not executed. After the recording operation is executed on the remaining number of media 12, the maintenance operation is executed.

In the post-processing device 14, when the number of placed sheets reaches the number of sheets to be processed, and a result of subtracting the total number of transported sheets from the total number of sheets to be post-processed is one or two, the post-processing operation is not executed. When the total number of transported sheets matches the total number of sheets to be post-processed, the post-processing operation on the media 12 placed on the processing tray 54 is executed.

Effects of Second Embodiment

Effects of the second embodiment will be described.

7. When the measured time exceeds the defined time and the restriction condition is established, the maintenance operation is executed after the recording operation is executed on the remaining number of media 12 in the recording job. The restriction condition is established when the time for the maintenance operation is longer than the time for executing the recording operation on the remaining number of media 12 in the recording job. Thus, when the time for executing the recording operation on the remaining number of media 12 in the recording job is shorter than the time for the maintenance operation, the execution of the maintenance operation can be postponed until the recording operation on the remaining number of media 12 is ended. Therefore, a processing speed can be improved without significant deterioration in the recording quality due to the maintenance operation.

MODIFICATION EXAMPLES

The present embodiment can be implemented with the following modification examples. The present embodiment and the following modification examples can be implemented in combination with each other within the technically consistent range.

Although the time that has elapsed after displacement of the cap 33 from the contact position to the separation position is measured, the present disclosure is not limited to this. For example, the time that has elapsed after the start of the maintenance operation may be measured. In this case, it is preferable that the time for the maintenance operations are the same. Defined times may be different because the time for the maintenance operations are different. For example, the time that has elapsed from the timing at which the liquid ejection head 28 ejects the liquid may be measured. In these cases, consequently, the time may be measured with reference to displacement of the cap 33 from the contact position to the separation position.

The recording start condition may be established when the image processing is ended. The recording start condition may be established when a predetermined time has elapsed or when image processing is ended. As described above, in a case where the recording start condition is established when the image processing is ended, a timing at which the recording start condition is established changes depending on an image processing time. Thus, in the first mode, the initial number of sheets is defined such that the recording operation on the initial number of media 12 is ended before the measured time exceeds the defined time. Consequently, maintenance operations and post-processing operations can be appropriately executed even when image processing is prolonged for some time.

The timing from the input of the recording job information is the same in the first mode and the second mode for feeding, transporting, and recording operations of the second and subsequent media 12 in the recording job, but the present disclosure is not limited to this. For example, the timing from the input of recording job information may be earlier in the first mode than in the second mode for the feeding, transporting, and recording operations of the second and subsequent media 12 in the recording job. In this case, it is preferable that the second medium 12 is placed on the processing tray 54 after the post-processing operation on the first medium 12 is ended.

In the first mode, two or more media 12 may be waiting at the standby position WP. That is, in the first mode, at least one medium 12 may be waiting at the standby position WP. That is, a processing speed of the recording operation on at least one medium 12 may be improved.

In the first mode, after the post-processing operation is executed on the first medium 12 during the first initial control period, the post-processing operation is executed on the second number of sheets S2 of the media 12 during the second initial control period, but the present disclosure is not limited to this. For example, there may be a configuration in which, in the first mode, during the initial control period, the post-processing operation is not executed on the first medium 12 alone, and is executed on the one medium 12 and the second number of sheets S2 of the media 12. As described above, the first mode may be a mode for increasing a processing speed of at least one of the recording operation and the post-processing operation on the first medium 12.

The type of maintenance is not limited to flushing, and may include cleaning and the like.

An execution timing of the post-processing operation may be controlled with reference to a timing of the maintenance operation. A timing of the maintenance operation may be controlled with reference to an execution timing of the post-processing operation. That is, the post-processing operation may be executed by using the time for the maintenance operation.

The plurality of modes may include a mode other than the first mode and the second mode.

The second mode may be a mode in which a processing speed for the first medium 12 is not improved compared with the first mode, and may be a mode in which processes other than a stacking process are executed as the post-processing.

Although a mode is set to correspond to the recording job, the present disclosure is not limited to this, and the mode may be set in the recording device 13 instead of each recording job.

Figure 4:
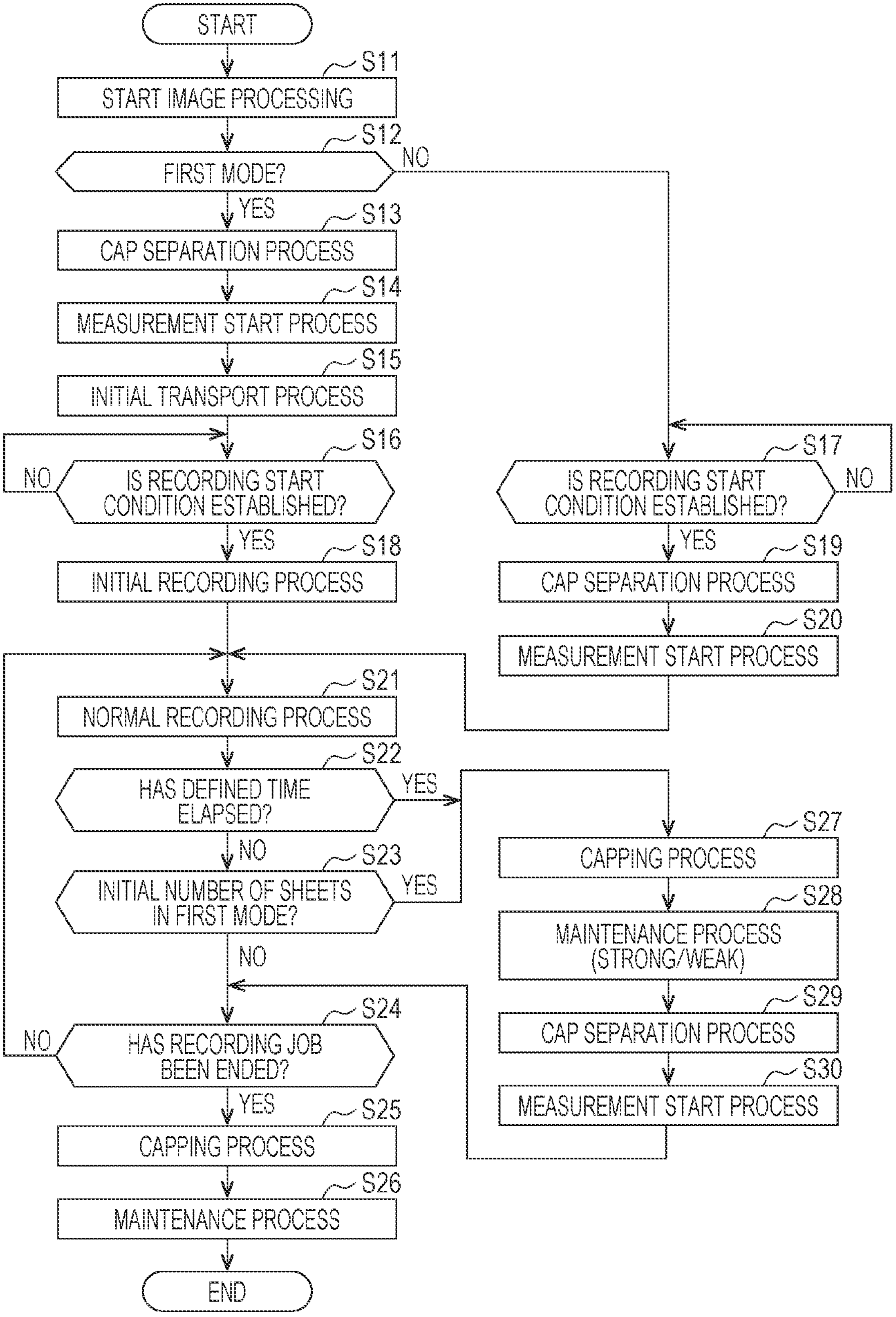
FIG. 4 is a flowchart illustrating a recording control process.

As in step S26 in FIG. 4, the maintenance operation does not have to be executed when the recording job is ended.

The post-processing device 14 and the intermediate device 15 may be combined into a post-processing device. The post-processing device 14 may receive the medium 12 after recording from recording device 13 rather than from intermediate device 15.

The medium 12 is not limited to paper, and may be a synthetic resin film, cloth, a non-woven fabric, a laminated medium, or the like.

Any liquid can be selected as long as the liquid can be recorded on the medium 12 by adhering to the medium 12. For example, ink includes one obtained by dissolving, dispersing, or mixing solid functional material particles such as pigments and metal particles in a solvent, and includes various compositions such as water-based ink, oil-based ink, gel ink, and hot-melt ink.

The recording device 13 is not limited to a printer, and may be a multi-function peripheral having a scanning mechanism and a copying function in addition to the recording function.

APPENDIX

The technical ideas and operations and effects thereof obtained from the above-described embodiments and modification examples will be described below.

A. A recording system including a transport section configured to transport a medium along a transport path; a liquid ejection head configured to execute a recording operation of performing recording on the medium by ejecting a liquid onto the medium; a cap configured to be displaced between a separation position separated from the liquid ejection head and a maintenance position for performing maintenance on the liquid ejection head; a processing tray configured to place thereon the medium subjected to recording by the liquid ejection head; a post-processing section configured to execute a post-processing operation on the medium placed on the processing tray; and a control section, in which the control section is configured to measure a time with reference to displacement of the cap from the maintenance position to the separation position, the liquid ejection head is configured to execute the recording operation in a state in which the cap is located at the separation position in a recording job for performing recording on a predetermined number of media, and to execute a maintenance operation in which the liquid is ejected in a state in which the cap is located at the maintenance position when a time measured by the control section exceeds a defined time, the transport path has a standby position at which the medium is configured to wait upstream of the liquid ejection head, the transport section is configured to cause a first medium to wait at the standby position before start of the recording operation in the recording job, the cap is located at the separation position when the first medium in the recording job is waiting at the standby position before the start of the recording operation in the recording job, and the control section, during an initial control period among control periods associated with the recording job, causes the liquid ejection head to execute the maintenance operation and also causes the post-processing section to execute the post-processing operation on a second number of media smaller than a first number of media, and after end of the initial control period, causes the liquid ejection head to execute the maintenance operation and also causes the post-processing section to execute the post-processing operation on the first number of media.

According to this configuration, at least the first medium can be made to wait at the standby position and the cap can be displaced from the contact position to the separation position before the recording operation in the recording job is started. Consequently, it is possible to reduce a processing time from the start of the recording operation in the recording job for at least the first medium.

In the initial control period among the control periods associated with the recording job, the post-processing operation can be executed by using the time for the maintenance operation for the second number of media that is less than the first number of media after the initial control period is ended. Consequently, even when the time for the maintenance operation is reduced, the post-processing operation can be executed by using the time for the maintenance operation by executing the post-processing operation on the second number of media that is less than the first number of media. When the measured time exceeds the defined time, the cap is displaced from the retracted position to the contact position, and thus it is possible to suppress drying of the liquid ejection head. Therefore, the processing speed can be improved without deterioration in the recording quality due to the maintenance operation.

B. There may be a configuration in which the control section is configured to select control of either one of a first mode and a second mode different from the first mode, the first mode is a mode in which a timing of the recording operation and a timing of the post-processing operation are advanced for at least the first medium with reference to start of the recording job, compared with the second mode, in the first mode, the transport section causes the first medium to wait at the standby position before the start of the recording operation in the recording job, in the first mode, the cap is located at the separation position when the first medium in the recording job is waiting at the standby position, the initial control period is a control period in the first mode, the initial control period includes a first initial control period and a second initial control period after end of the first initial control period, and the control section, in the first mode, during the first initial control period, causes the post-processing section to discharge a first medium that is not formed as a medium bundle on the processing tray from the processing tray, during the second initial control period, causes the liquid ejection head to execute the maintenance operation and also causes the post-processing section to discharge the second number of media formed as a medium bundle on the processing tray from the processing tray, and after end of the second initial control period, causes the liquid ejection head to execute the maintenance operation and also causes the post-processing section to discharge the first number of media formed as a medium bundle on the processing tray from the processing tray.

According to this configuration, it is possible to reduce the processing time until the first medium is discharged. Consequently, it is possible to provide a user with a situation in which the first medium can be checked at an early stage. Therefore, the processing speed can be improved without deterioration in the recording quality due to the maintenance operation.

C. There may be a configuration in which, in the first mode, the liquid ejection head executes the recording operation on a predetermined initial number of media after the start of the recording job even before the time measured by the control section exceeds the defined time, and then executes a first maintenance operation after the start of the recording job.

According to this configuration, after the start of the recording job, even before the measured time exceeds the defined time, the recording operation on the initial number of media is performed, and thus it is possible to reliably execute the first maintenance operation. Therefore, the processing speed can be improved without deterioration in the recording quality due to the maintenance operation.

D. There may be a configuration in which, in the second mode, the post-processing section, during the control periods associated with the recording job, discharges the first number of media formed as a medium bundle on the processing tray from the processing tray by using a time for the maintenance operation executed by the liquid ejection head.

According to this configuration, in the second mode, the post-processing operation can be executed on the first number of media during the control periods associated with the recording job. As described above, when either one of the first mode and the second mode can be controlled, control of the post-processing operation can be switched depending on a situation. Therefore, depending on a situation, a processing speed can be improved without deterioration in the recording quality due to the maintenance operation.

E. There may be a configuration in which, in the first mode, the liquid ejection head ejects a first ejection amount of liquid in a first maintenance operation in the recording job, and in the first mode, ejects the liquid in a second ejection amount that is larger than the first ejection amount in second and subsequent maintenance operations in the recording job.

According to this configuration, in the first mode, in the first maintenance operation in the recording job, a liquid ejection amount can be made smaller than in the second and subsequent maintenance operations. Therefore, it is possible to reduce consumption of a liquid due to the maintenance operation without deterioration in the recording quality due to the maintenance operation.

F. There may be a configuration in which, in the first mode, the liquid ejection head is configured to execute a first maintenance operation in the recording job over a first processing time, and in the first mode, to execute second and subsequent maintenance operations in the recording job over a second processing time longer than the first processing time.

According to this configuration, in the first mode, a processing time for the first maintenance operation in the recording job can be reduced compared with the second and subsequent maintenance operations. Therefore, the processing speed can be improved without deterioration in the recording quality due to the maintenance operation.

G. There may be a configuration in which the liquid ejection head executes the recording operation on a remaining number of media in the recording job in a case where a restriction condition is established when the time measured by the control section in the recording job exceeds the defined time, and then executes the maintenance operation, and the restriction condition is established when a time for the maintenance operation is longer than a time for executing the recording operation on the remaining number of media in the recording job.

According to this configuration, when the time for executing the recording operation on the remaining number of media in the recording job is shorter than the time for the maintenance operation, execution of the maintenance operation can be postponed until the recording operation on the remaining number of media is ended. Therefore, a processing speed can be improved without significant deterioration in the recording quality due to the maintenance operation.

What is claimed is:

1. A recording system comprising:

a transport section configured to transport a medium along a transport path;

a liquid ejection head configured to execute a recording operation of performing recording on the medium by ejecting a liquid onto the medium;

a cap configured to be displaced between a separation position separated from the liquid ejection head and a maintenance position for performing maintenance on the liquid ejection head;

a processing tray configured to place thereon the medium subjected to recording by the liquid ejection head;

a post-processing section configured to execute a post-processing operation on the medium placed on the processing tray; and a control section, wherein the control section is configured to measure a time with reference to displacement of the cap from the maintenance position to the separation position, the liquid ejection head is configured to execute the recording operation in a state in which the cap is located at the separation position in a recording job for performing recording on a predetermined number of media, and to execute a maintenance operation in which the liquid is ejected in a state in which the cap is located at the maintenance position when a time measured by the control section exceeds a defined time, the transport path has a standby position at which the medium is configured to wait upstream of the liquid ejection head, the transport section is configured to cause a first medium to wait at the standby position before start of the recording operation in the recording job, the cap is located at the separation position when the first medium in the recording job is waiting at the standby position before the start of the recording operation in the recording job, and the control section during an initial control period among control periods associated with the recording job, causes the liquid ejection head to execute the maintenance operation and also causes the post-processing section to execute the post-processing operation on a second number of media smaller than a first number of media, and after end of the initial control period, causes the liquid ejection head to execute the maintenance operation and also causes the post-processing section to execute the post-processing operation on the first number of media.

2. The recording system according to claim 1, wherein the control section is configured to select control of either one of a first mode and a second mode different from the first mode, the first mode is a mode in which a timing of the recording operation and a timing of the post-processing operation are advanced for at least the first medium with reference to start of the recording job, compared with the second mode, in the first mode, the transport section causes the first medium to wait at the standby position before the start of the recording operation in the recording job, in the first mode, the cap is located at the separation position when the first medium in the recording job is waiting at the standby position, the initial control period is a control period in the first mode, the initial control period includes a first initial control period and a second initial control period after end of the first initial control period, and the control section, in the first mode, during the first initial control period, causes the post-processing section to discharge a first medium that is not formed as a medium bundle on the processing tray from the processing tray, during the second initial control period, causes the liquid ejection head to execute the maintenance operation and also causes the post-processing section to discharge the second number of media formed as a medium bundle on the processing tray from the processing tray, and after end of the second initial control period, causes the liquid ejection head to execute the maintenance operation and also causes the post-processing section to discharge the first number of media formed as a medium bundle on the processing tray from the processing tray.

3. The recording system according to claim 2, wherein in the first mode, the liquid ejection head executes a first maintenance operation after the start of the recording job after executing the recording operation on a predetermined initial number of media after the start of the recording job even before the time measured by the control section exceeds the defined time.

4. The recording system according to claim 2, wherein in the second mode, the post-processing section, during the control periods associated with the recording job, discharges the first number of media formed as a medium bundle on the processing tray from the processing tray by using a time for the maintenance operation executed by the liquid ejection head.

5. The recording system according to claim 2, wherein in the first mode, the liquid ejection head ejects a first ejection amount of liquid in a first maintenance operation in the recording job, and in the first mode, ejects the liquid in a second ejection amount that is larger than the first ejection amount in second and subsequent maintenance operations in the recording job.

6. The recording system according to claim 1, wherein the liquid ejection head executes the recording operation on a remaining number of media in the recording job in a case where a restriction condition is established when the time measured by the control section in the recording job exceeds the defined time, and then executes the maintenance operation, and the restriction condition is established when a time for the maintenance operation is longer than a time for executing the recording operation on the remaining number of media in the recording job.

7. A control method for a recording system including a transport section configured to transport a medium along a transport path, a liquid ejection head configured to execute a recording operation of performing recording on the medium by ejecting a liquid onto the medium, a cap configured to be displaced between a separation position separated from the liquid ejection head and a maintenance position for performing maintenance on the liquid ejection head, a processing tray configured to place thereon the medium subjected to recording by the liquid ejection head, and a post-processing section configured to execute a post-processing operation on the medium placed on the processing tray, the transport path being a path having a standby position at which the medium is configured to wait upstream of the liquid ejection head, the control method comprising:

measuring a time based on displacement of the cap from the maintenance position to the separation position;

causing the liquid ejection head to execute the recording operation in a state in which the cap is located at the separation position in a recording job in which the liquid ejection head executes recording on a predetermined number of media;

causing the liquid ejection head to execute a maintenance operation in which the liquid is ejected in a state in which the cap is located at the maintenance position when the measured time exceeds a defined time;

causing the transport section to cause a first medium to wait at the standby position before start of the recording operation in the recording job;

locating the cap at the separation position when the first medium in the recording job is waiting at the standby position before the start of the recording operation in the recording job;

during an initial control period among control periods associated with the recording job, causing the liquid ejection head to execute the maintenance operation and also causing the post-processing section to execute the post-processing operation on a second number of media smaller than a first number of media; and after end of the initial control period, causing the liquid ejection head to execute the maintenance operation and also causing the post-processing section to execute the post-processing operation on the first number of media.

8. The control method for the recording system according to claim 7, further comprising:

executing control of either one of a first mode and a second mode different from the first mode; and in the first mode that is a mode in which a timing of the recording operation and a timing of the post-processing operation on the first medium are advanced with reference to start of the recording job compared with the second mode, causing the transport section to cause the first medium to wait at the standby position before the start of the recording operation in the recording job;

locating the cap at the separation position when the first medium in the recording job is waiting at the standby position;

during a first initial control period in the initial control period that is a control period in the first mode, causing the post-processing section to discharge the first medium that is not formed as a medium bundle on the processing tray from the processing tray;

during a second initial control period in the initial control period that is a control period in the first mode, causing the post-processing section to discharge the second number of media formed as a medium bundle on the processing tray from the processing tray and also causing the liquid ejection head to execute the maintenance operation; and after end of the second initial control period, causing the liquid ejection head to execute the maintenance operation and also causing the post-processing section to discharge the first number of media formed as a medium bundle on the processing tray from the processing tray.

9. The control method for the recording system according to claim 8, further comprising:

in the first mode, executing the recording operation on a predetermined initial number of media after the start of the recording job even before the measured time exceeds the defined time, and then causing the liquid ejection head to execute a first maintenance operation after the start of the recording job.

10. The control method for the recording system according to claim 8, further comprising:

in the second mode, during the control periods associated with the recording job, causing the post-processing section to discharge the first number of media formed as a medium bundle on the processing tray from the processing tray and also causing the liquid ejection head to execute the maintenance operation.

11. The control method for the recording system according to claim 8, further comprising:

in the first mode, causing the liquid ejection head to eject a first ejection amount of liquid in a first maintenance operation in the recording job, and in the first mode, to eject the liquid in a second ejection amount that is larger than the first ejection amount in second and subsequent maintenance operations in the recording job.

12. The control method for the recording system according to claim 7, further comprising:

causing the liquid ejection head to execute the recording operation on a remaining number of media in the recording job and then to execute the maintenance operation on the remaining number of medium in the recording job, when the measured time in the recording job exceeds the defined time, and a time for the maintenance operation is longer than a time for executing the recording operation on a remaining number of media in the recording job.

* * * * *